US012256404B2

(12) United States Patent
Lee et al.

(10) Patent No.: US 12,256,404 B2
(45) Date of Patent: Mar. 18, 2025

(54) METHOD AND APPARATUS FOR CONFIGURING BEAM IN WIRELESS COMMUNICATION SYSTEM

(71) Applicant: Samsung Electronics Co., Ltd., Suwon-si (KR)

(72) Inventors: Kyunggyu Lee, Suwon-si (KR); Jinyoung Oh, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 17/689,540

(22) Filed: Mar. 8, 2022

(65) Prior Publication Data

US 2022/0295530 A1 Sep. 15, 2022

(30) Foreign Application Priority Data

Mar. 8, 2021 (KR) ........................ 10-2021-0030052

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......................... H04W 72/0446; H04W 72/23
USPC .......................................................... 370/336
See application file for complete search history.

(56) References Cited

U.S. PATENT DOCUMENTS

2019/0313429 A1* 10/2019 Cheng .................. H04W 76/27
2020/0351892 A1 11/2020 Yi et al.
2021/0021330 A1 1/2021 Khoshnevisan et al.
2021/0058113 A1 2/2021 Jung et al.

FOREIGN PATENT DOCUMENTS

WO 2021/008673 A1 1/2021

OTHER PUBLICATIONS

International Search Report with Written Opinion dated Jun. 13, 2022; International Appln. No. PCT/KR2022/003282.

* cited by examiner

*Primary Examiner* — Peter G Solinsky
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by a terminal is provided. The method performed by a terminal includes receiving, from a base station, DCI scheduling a plurality of PDSCHs on a PDCCH, wherein the DCI includes information on a TDRA and information on a TCI state, identifying symbol offsets between the PDCCH and the plurality of PDSCHs based on the TDRA, in case that a first symbol offset between the PDCCH and a first PDSCH is less than a threshold, receiving, from the base station, the first PDSCH based on a default TCI state, and in case that a second symbol offset between the PDCCH and a second PDSCH is equal to or greater than the threshold, receiving, from the base station, the second PDSCH based on the TCI state.

20 Claims, 18 Drawing Sheets

Single cell LTE/NR (1100)
gNB
SDAP (1125)
PDCP (1130)
RLC (1135)
MAC (1140)
PHY (1145)
UE
PHY (1150)
MAC (1155)
RLC (1160)
PDCP (1165)
SDAP (1170)
Carrier aggregation (1110)
gNB
SDAP
PDCP
RLC
MAC
PHY
PHY
UE
PHY
PHY
MAC
RLC
PDCP
SDAP
Dual connectivity (1120)
MgNB
SDAP
PDCP
RLC
MAC
PHY
SgNB
RLC
MAC
PHY
UE
PHY
MAC
RLC
PDCP
SDAP
PHY
MAC
RLC

METHOD AND APPARATUS FOR CONFIGURING BEAM IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0030052, filed on Mar. 8, 2021, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for configuring a beam for receiving data in a wireless communication system.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The Internet, which is a human centered connectivity network where humans generate and consume information, is now evolving to the Internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

There has been extensive discussion for applying a beamforming technology for effectively transmitting/receiving signals in super-high-frequency bands in 5G communication systems.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for determining a beam for receiving data by a terminal in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, downlink control information (DCI) scheduling a plurality of physical downlink shared channels (PDSCHs) on a physical downlink control channel (PDCCH), wherein the DCI includes information on a time domain resource assignment (TDRA) and information on a transmission configuration indication (TCI) state, identifying symbol offsets between the PDCCH and the plurality of PDSCHs based on the TDRA, in case that a first symbol offset between the PDCCH and a first PDSCH included in the plurality of PDSCHs is less than a threshold, receiving, from the base station, the first PDSCH based on a default TCI state, and in case that a second symbol offset between the PDCCH and a second PDSCH included in the plurality of PDSCHs is equal to or greater than the threshold, receiving, from the base station, the second PDSCH based on the TCI state.

In accordance with another aspect of the disclosure, a terminal in a wireless communication system is provided. The terminal includes a transceiver configured to at least one of transmit and receive a signal and a processor communicably coupled with the transceiver, wherein the processor is configured to receive, from a base station, DCI scheduling a plurality of PDSCHs on a PDCCH, wherein the DCI includes information on a TDRA and information on a TCI state, identify symbol offsets between the PDCCH and the plurality of PDSCHs based on the TDRA, in case that a first symbol offset between the PDCCH and a first PDSCH included in the plurality of PDSCHs is less than a threshold, receive, from the base station, the first PDSCH based on a default TCI state, and in case that a second symbol offset between the PDCCH and a second PDSCH included in the plurality of PDSCHs is equal to or greater than the threshold, receive, from the base station, the second PDSCH based on the TCI state.

In accordance with another aspect of the disclosure, a method performed by a base station in a wireless communication system is provided. The method includes transmitting, to a terminal, DCI scheduling a plurality of PDSCHs on a PDCCH, wherein the DCI includes information on a TDRA and information on a TCI state, in case that a first symbol offset between the PDCCH and a first PDSCH included in the plurality of PDSCHs, transmitting, to the terminal, the first PDSCH based on a default TCI state, and in case that a second symbol offset between the PDCCH and a second PDSCH included in the plurality of PDSCHs, transmitting, to the terminal, the second PDSCH based on the TCI state, wherein the first symbol offset and the second symbol offset is identified based on the TDRA and a number of symbols allocated for the PDCCH.

According to the disclosure, a reception beam configuration may be clarified by considering a beam change time when a terminal receives data from a base station in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
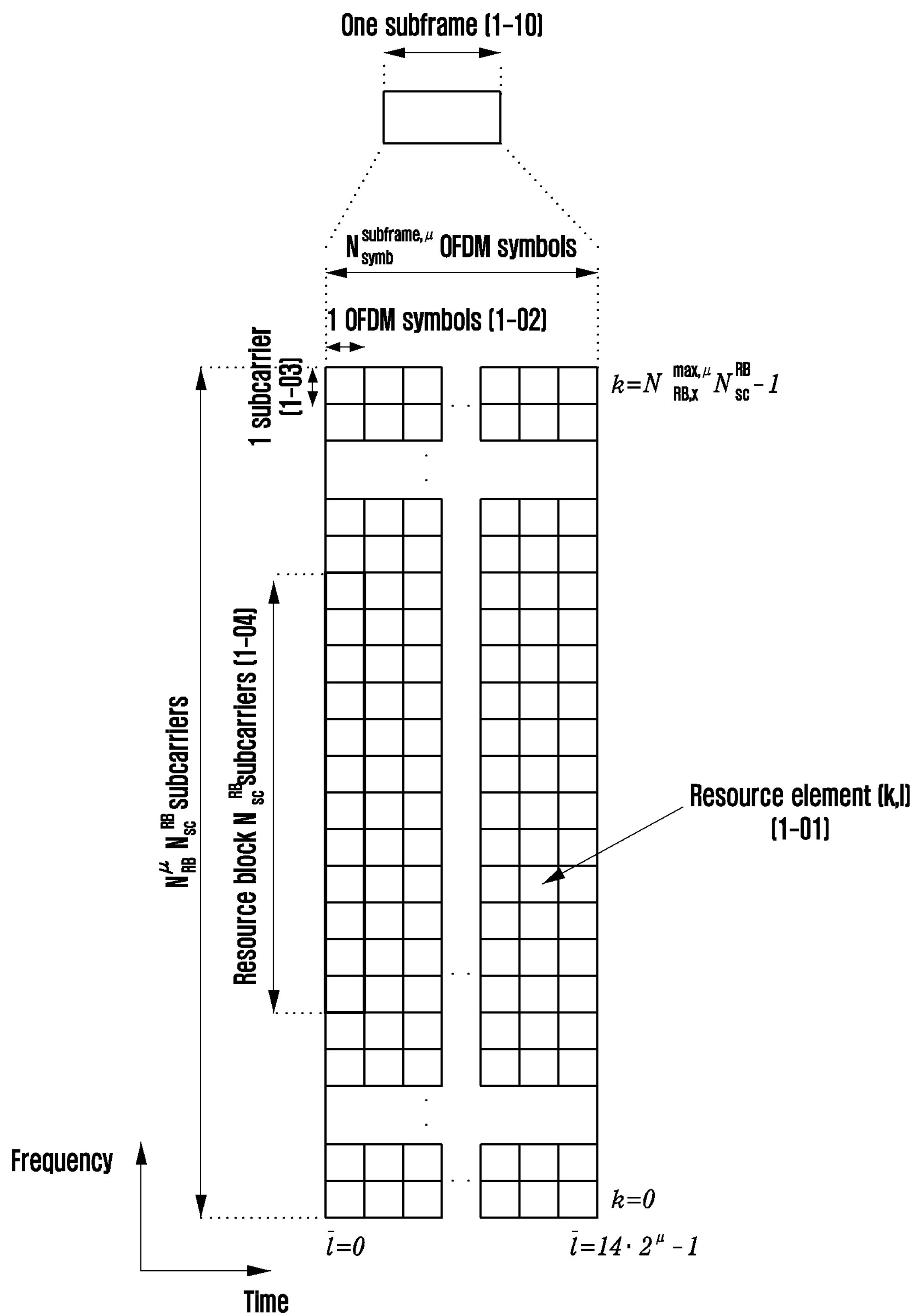
FIG. 1 illustrates a transmission structure of a time-frequency domain in long-term evolution (LTE or evolved universal terrestrial radio access (E-UTRA)), LTE-Advanced (LTE-A), NR, or a wireless communication system similar thereto according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging internet of things (IoT) technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) based on G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, 802.16e of IEEE, and the like.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme normally allocates and operates time-frequency resources for transmission of data or control information according to each user so as to prevent the time-frequency resources from overlapping with each other, that is, to establish orthogonality, thereby distinguishing the data or the control information of each user.

As a future communication system after LTE, that is, a 5G communication system has to be able to freely reflect various requirements of a user and a service provider, and thus services satisfying various requirements need to be supported. The services considered for the 5G communication system include enhanced mobile broadband (eMBB), massive machine-type communication (mMTC), ultra-reliability low latency communication (URLLC), and the like.

According to some embodiments, eMBB aims to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. At the same time, the 5G communication system should provide the increased user perceived data rate of the terminal. In order to satisfy such requirements, improvement of various transmitting/receiving technologies including a further improved multi input multi output (MIMO) transmission technology is needed. In addition, the 5G communication system uses a bandwidth wider than 20 MHz in a frequency band of 3 to 6 GHz or more than 6 GHz, instead of a 2 GHz band used by the current LTE, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/$km^2$) in a cell because it is attached to various sensors and devices to provide communication functions. In addition, because the terminals supporting mMTC are more likely to be positioned in shaded areas not covered by a cell, such as a basement of a building due to nature of services, the terminals may require a wider coverage than other services provided by the 5G communication system. The terminals supporting mMTC should be configured as inexpensive terminals and require very long battery life time because it is difficult to frequently replace batteries of the terminals.

Finally, URLLC is a cellular-based wireless communication service used for mission-critical purposes, and the URLLC may consider a service used in remote control for robots or machinery, industrial automation, unmanned aerial vehicles, remote health care, emergency alerts, and the like. Accordingly, the URLLC should provide very low latency and very high reliability. For example, URLLC-supportive services need to meet an air interface latency of less than 0.5 milliseconds and simultaneously include requirements of a packet error rate of $10^{-5}$ or less. Accordingly, for URLLC-supportive services, the 5G system should provide a transmit time interval (TTI) shorter than those for other services while securing design requirements for allocating a broad resource in a frequency band. However, the aforementioned mMTC, URLLC, and eMBB are only examples of different service types, and the service types to which the disclosure is applied are not limited to the above-described examples.

The above-discussed services considered in the 5G communication system should be converged with each other and provided, based on a single framework. That is, for an effective resource management and control, it is desirable that such services are controlled and transmitted by being integrated into one system rather than being operated independently.

In addition, although an embodiment of the disclosure will be described below using an LTE, LTE-A, LTE Pro, or NR system as an example, the embodiment of the disclosure may be applied to other communication systems having similar technical backgrounds or channel types. In addition, an embodiment of the disclosure may be applied to other communication systems through some modifications within a range which does not significantly depart from the scope of the disclosure, as determined by a person having skilled technical knowledge.

The disclosure relates to a method and apparatus for reporting channel state information for increasing power saving efficiency of a terminal in a wireless communication system.

According to the disclosure, when the terminal operates in a power saving mode in the wireless communication system, the power saving effect can be further improved by optimizing the channel state information reporting method accordingly.

Hereinafter, the frame structure of a 5G system will be described in more detail with reference to the drawings.

FIG. 1 illustrates the basic structure of a time-frequency domain of a wireless communication system according to an embodiment of the disclosure.

Referring to FIG. 1, the horizontal axis represents a time domain, and the vertical axis represents a frequency domain. A basic unit of resources in the time-frequency domain may be a resource element (RE) 1-01. The resource element 1-01 may be defined by 1 orthogonal frequency division multiplexing (OFDM) symbol 1-02 in a time domain and 1 subcarrier 1-03 in a frequency domain. In the frequency domain, $N_{sc}^{RB}$ (for example, 12) consecutive REs may configure one resource block (RB) 1-04. In an embodiment, a plurality of OFDM symbols may configure one subframe 1-10.

Figure 2:
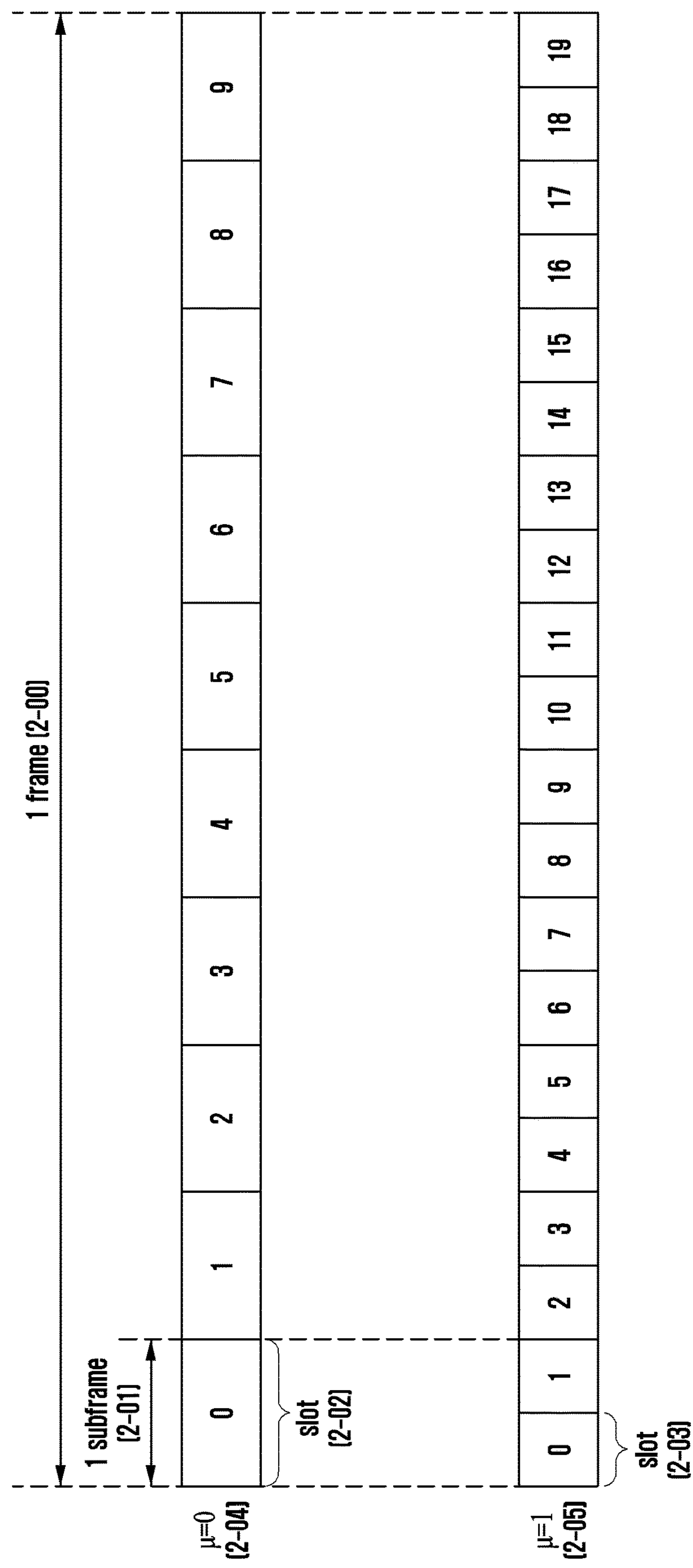
FIG. 2 illustrates a frame, a subframe, and a slot structure in a 5th generation (5G) according to an embodiment of the disclosure.

FIG. 2 illustrates a frame, a subframe, and a slot structure in a wireless communication system according to an embodiment of the disclosure.

Referring to FIG. 2, one frame 2-00 may be configured by one or more subframes 2-01, and one subframe may include one or more slots 2-02. For example, 1 frame 2-00 may be defined as 10 ms. 1 subframe 2-01 may be defined as 1 ms, and here 1 frame 2-00 may be configured by a total of 10 subframes 2-01. 1 slot 2-02 or 2-03 may be defined as 14 OFDM symbols (i.e., the number of symbols per slot ($N_{symb}^{slot}$=14)). 1 subframe 2-01 may be configured by one or multiple slots 2-03 and 2-03, and the number of slots 2-02 and 2-03 per subframe 2-01 may differ according to configuration value μ 2-04 or 2-05 for a subcarrier spacing. In the example of FIG. 2, a case in which the subcarrier spacing configuration value is μ=0 (indicated by reference numeral 2-04) and μ=1 (indicated by reference numeral 2-05) is illustrated. In a case of μ=0 (indicated by reference numeral 2-04), 1 subframe 2-01 may include 1 slot 2-02, and in a case of μ=1 (indicated by reference numeral 2-05), 1 subframe 2-01 may include two slots 2-03. That is, the number of slots per subframe ($N_{slot}^{subframe,\mu}$) may differ according to a subcarrier spacing configuration value μ, and accordingly, the number of slots per frame ($N_{slot}^{frame,\mu}$) may differ. According to each subcarrier spacing configuration μ, $N_{slot}^{subframe,\mu}$ and $N_{slot}^{frame,\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE always receives a signal over the entire serving cell bandwidth, such as in the LTE system, power consumption of the UE may be extreme, and in order to solve this problem, it is possible for a base station to configure one or more bandwidth parts (BWPs) for the UE so as to support the UE to change a reception area within a cell. In NR, the base station may configure an "initial BWP", which is a bandwidth of CORESET #0 (or common search space (CSS)), for the UE via a master information block (MIB). Thereafter, the base station may configure an initial BWP (first BWP) of the UE via RRC signaling, and may notify of at least one BWP configuration information via downlink control information (DCI) in the future. Thereafter, the base station may indicate which band the UE is to use, by notifying of a BWP ID via DCI. If the UE fails to receive DCI in a currently allocated BWP for a specific period of time or longer, the UE returns to a "default bandwidth part" and attempts to receive DCI.

Figure 3:
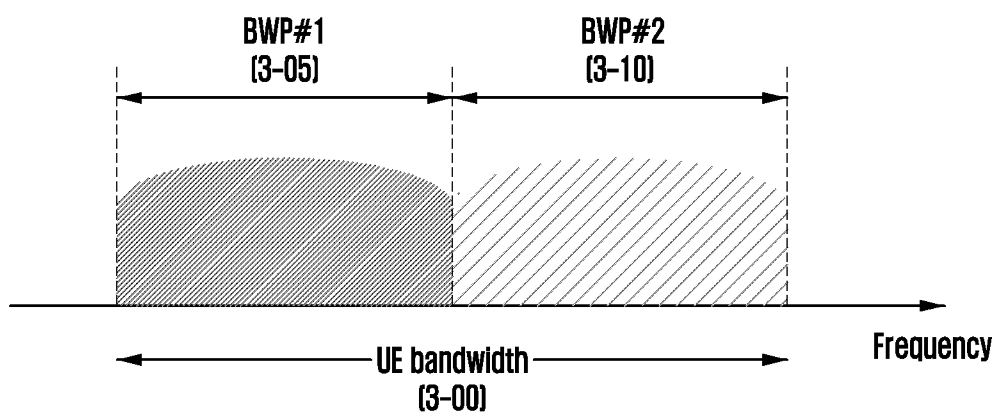
FIG. 3 illustrates an example of a bandwidth part (BWP) configuration in a wireless communication system according to an embodiment of the disclosure.

FIG. 3 illustrates an example of a bandwidth part (BWP) configuration in a wireless communication system according to an embodiment of the disclosure.

Referring to FIG. 3, an example, in which a UE bandwidth 3-00 is configured by two BWPs, that is, BWP #1 3-05 and BWP #2 3-10, is shown. The base station may configure one or multiple BWPs for the UE, and may configure pieces of information as shown in Table 2 below for each bandwidth part.

TABLE 2

```
BWP ::=                        SEQUENCE {
    bwp-Id                         BWP-Id,
  (Bandwidth part identifier)
    locationAndBandwidth       INTEGER (1..65536),
    (Bandwidth part location)
```

TABLE 2-continued

| | |
|---|---|
| subcarrierSpacing (Subcarrier spacing) | ENUMERATED {n0, n1, n2, n3, n4, n5}, |
| cyclicPrefix (Cyclic prefix) | ENUMERATED { extended } |
| } | |

An embodiment of the disclosure is not limited to the above example, and in addition to the configuration information, various parameters related to a BWP may be configured in the UE. The pieces of information may be transmitted by the base station to the UE via higher layer signaling, for example, RRC signaling. At least one BWP among the configured one or multiple BWPs may be activated. Whether to activate the configured BWP may be semi-statically transmitted from the base station to the UE via RRC signaling or may be dynamically transmitted through an MAC control element (CE) or DCI.

According to an embodiment, a UE before radio resource control (RRC) connection may be configured with an initial BWP for initial access from a base station through a master information block (MIB). More specifically, the UE may receive configuration information about a search apace and a control resource set (CORESET) through which the PDCCH can be transmitted, in order to receive system information required for initial access (which may correspond to remaining system information (RMSI) or system information block 1 (SIB 1)) through the MIB in an initial access operation. The control resource set (CORESET) and search space, which are configured through the MIB, may be regarded as identity (ID) 0, respectively.

The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identity (ID) of the initial BWP may be regarded as zero.

The configuration of the BWP supported by the above-described next-generation mobile communication system (5G or NR system) may be used for various purposes.

As an example, in case that a bandwidth supported by the UE is smaller than a system bandwidth, the bandwidth supported by the UE may be supported through the BWP configuration. For example, in Table 2, a frequency location (configuration information 2) of the BWP is configured for the UE so as to enable the UE to transmit or receive data at a specific frequency location within the system bandwidth.

According to another example, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when attempting to transmit or receive data at a specific subcarrier spacing, the BWP configured with the corresponding subcarrier spacing may be activated.

According to still another example, the base station may configure, in the UE, BWPs having bandwidths of different sizes for the purpose of reducing power consumption of the UE. For example, when the UE supports a very large bandwidth, for example, a bandwidth of 100 MHz, and always transmits or receives data through the corresponding bandwidth, very large power consumption may occur. In particular, in a situation where there is no traffic, it is very inefficient, in terms of power consumption, for the UE to monitor an unnecessary downlink control channel for a large bandwidth of 100 MHz. Therefore, for the purpose of reducing power consumption of the UE, the base station may configure, for the UE, a bandwidth part of a relatively small bandwidth, for example, the bandwidth part of 20 MHz. In a situation where there is no traffic, the UE may perform a monitoring operation in the bandwidth part of 20 MHz. When data to be transmitted or received has occurred, the UE may transmit or receive the data by using the bandwidth part of 100 MHz according to an indication of the base station.

In a method of configuring the bandwidth part, the UEs before the RRC connection may receive configuration information about the initial bandwidth part through the master information block (MIB) in the initial access operation. More specifically, the UE may be configured with a control region (or control resource set (CORESET)) for a downlink control channel through which downlink control information (DCI) for scheduling a system information block (SIB) may be transmitted from a MIB of a physical broadcast channel (PBCH). The bandwidth of the control resource set configured through the MIB may be regarded as the initial BWP. The UE may receive, through the configured initial BWP, a PDSCH through which the SIB is transmitted. The initial BWP may be used for other system information (OSI), paging, and random access in addition to the reception of the SIB.

Hereinafter, a synchronization signal (SS)/PBCH block (SSB) of a next generation mobile communication system (5G or NR system) will be described.

The SS/PBCH block may refer to a physical layer channel block including a primary SS (PSS), a secondary SS (SSS), and a PBCH. More specifically, the SS/PBCH block may be defined as follows:

PSS: which is a signal that serves as a reference for downlink time/frequency synchronization and provides some information of a cell ID.

SSS: which serves as a reference for downlink time/frequency synchronization, and provides the remaining cell ID information that is not provided by the PSS. In addition, the SSS may serve as a reference signal for demodulation of the PBCH.

PBCH: which provides essential system information required for transmission or reception of a data channel and a control channel of a UE. The essential system information may include search space-related control information indicating radio resource mapping information of a control channel, scheduling control information for a separate data channel for transmission of system information, and the like.

SS/PBCH block: the SS/PBCH block may include a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may acquire the MIB from the PBCH, and may be configured with the control resource set #0 through the MIB. The UE may monitor the control resource set #0 under the assumption that the selected SS/PBCH block and a demodulation reference signal (DMRS) transmitted in the control resource set #0 are quasi-co-located (QCLed). The UE may receive system information through downlink control information transmitted from the control resource set #0. The UE may acquire, from the received system information, random access channel (RACH)-related configuration information required for initial access. The UE may transmit a physical RACH (PRACH) to the base station by considering the selected SS/PBCH index, and the base station having received the PRACH may acquire information about an SS/PBCH block index selected by the UE. The base station may know which block is selected, by the UE, among the SS/PBCH blocks, and may know that the UE has monitored the control resource set #0 corresponding to (or associated with) the selected SS/PBCH block.

Hereinafter, downlink control information (hereinafter, referred to as DCI) in a next generation mobile communication system (5G or NR system) will be described in detail.

In next generation mobile communication system (5G or NR system), scheduling information about uplink data (or physical uplink shared channel (PUSCH) or downlink data (or physical downlink shared channel (PDSCH)) is transmitted from a base station to a UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a PDCCH which is a physical downlink control channel after channel coding and modulation is performed thereon. A cyclic redundancy check (CRC) may be attached to a DCI message payload, and the CRC may be scrambled by a radio network temporary identifier (RNTI) corresponding to the identity of the UE. Depending on the purpose of the DCI message, for example, UE-specific data transmission, power control command, random access response, etc. different RNTIs may be used for scrambling of the CRC attached to the payload of the DCI message. That is, the RNTI may not be explicitly transmitted, and may be included in a CRC calculation process and then transmitted. When receiving the DCI message transmitted through the PDCCH, the UE may check a CRC by using an assigned RNTI. When a result of CRC check is correct, the UE may know that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI. In an embodiment, the DCI format 0_0 in which the CRC is scrambled by the C-RNTI may include, for example, pieces of information such as Table 3 below.

TABLE 3

Identifier for DCI formats - [1] bit
Frequency domain resource assignment - $[\lceil \log_2(N_{RB}^{UL,BWP}(N_{RB}^{UL,BWP}+1)/2\rceil]$bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
Uplink (UL)/Supplementary UL (SUL) indicator - 0 or 1 bit DCI format 0_1 may be used as a non-fallback DCI for scheduling a PUSCH. Here, a CRC may be scrambled by a C-RNTI. In an embodiment, the DCI format 0_1 in which the CRC is scrambled by the C-RNTI may include, for example, pieces of information of Table 4 below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P\rceil$ bits
For resource allocation type 1, $\lceil \log_2(N_{RB}^{UL,BWP}(N_{RB}^{UL,BWP}+1)/2)\rceil$ bits
Time domain resource assignment −1, 2, 3, or 4 bits
Virtual resource block (VRB)-to- physical resource block (PRB) mapping) -
0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks; 0 bit otherwise.
TPC command for scheduled PUSCH - 2 bits $SRS$ resource indicator $-\left\lceil \log_2\left(\sum_{k=1}^{L_{max}}\binom{N_{SRS}}{k}\right)\right\rceil$ or $\lceil \log_2(N_{SRS})\rceil$ bits $\left\lceil \log_2\left(\sum_{k=1}^{L_{max}}\binom{N_{SRS}}{k}\right)\right\rceil$ bits for non−codebook based $PUSCH$ transmission;
$\lceil \log_2(N_{SRS})\rceil$ bits for codebook based PUSCH transmission.
Precoding information and number of layers −up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-Demodulation reference signal (DMRS) association - 0 or 2 bits.
beta_offset indicator - 0 or 2 bits
DMRS sequence initialization - 0 or 1 bit DCI format 1_0 may be used as a fallback DCI for scheduling a PDSCH. Here, a CRC may be scrambled by a C-RNTI. In an embodiment, the DCI format 1_0 in which the CRC is scrambled by the C-RNTI may include, for example, the following pieces of information of Table 5 below.

TABLE 5

| |
|---|
| Identifier for DCI formats - [1] bit |
| Frequency domain resource assignment - [ $\lceil \log_2(N_{RB}^{DL,BWP}(N_{RB}^{DL,BWP}+1)/2) \rceil$ ] bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| Physical uplink control channel (PUCCH) resource indicator - 3 bits |
| PDSCH-to-HARQ feedback timing indicator - [3] bits |

Alternatively, DCI format 1_0 may be used as DCI for scheduling a PDSCH regarding the RAR message. Here, a CRC may be scrambled by a RA-RNTI. The DCI format 1_0 in which the CRC is scrambled by the C-RNTI may include, for example, pieces of information of Table 6 below.

TABLE 6

| |
|---|
| Frequency domain resource assignment - [ $\lceil \log_2(N_{RB}^{DL,BWP}(N_{RB}^{DL,BWP}+1)/2) \rceil$ ] bits |
| Time domain resource assignment - 4 bits |
| VRB-to-PRB mapping - 1 bit. |
| Modulation and coding scheme - 5 bits |
| TB scaling - 2 bits |
| Reserved bits - 16 bits |

DCI format 1_1 may be used as non-fallback DCI for scheduling a PDSCH. Here, a CRC may be scrambled by a C-RNTI. In an embodiment, the DCI format 1_1 in which the CRC is scrambled by the C-RNTI may include, for example, the following pieces of information of Table 7 below.

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P \rceil$ bits |
| For resource allocation type 1, $\lceil \log_2(N_{RB}^{DL,BWP}(N_{RB}^{DL,BWP}+1)/2) \rceil$bits |
| Time domain resource assignment - 1, 2, 3, or 4 bits |
| VRB-to-PRB - 0 or 1 bit, only for resource allocation type 1. |
| 0 bit if only resource allocation type 0 is configured; |
| 1 bit otherwise. |
| Physical resource block (PRB) bundling size indicator - 0 or 1 bit |
| Rate matching indicator - 0, 1, or 2 bits |
| Zero power channel state information reference signal (ZP CSI-RS) trigger -0, 1, or 2 bits |

TABLE 7-continued

| |
|---|
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| Code block group (CBG) flushing out information - 0 or 1 bit |
| DMRS sequence initialization - 1 bit |

Figure 4:
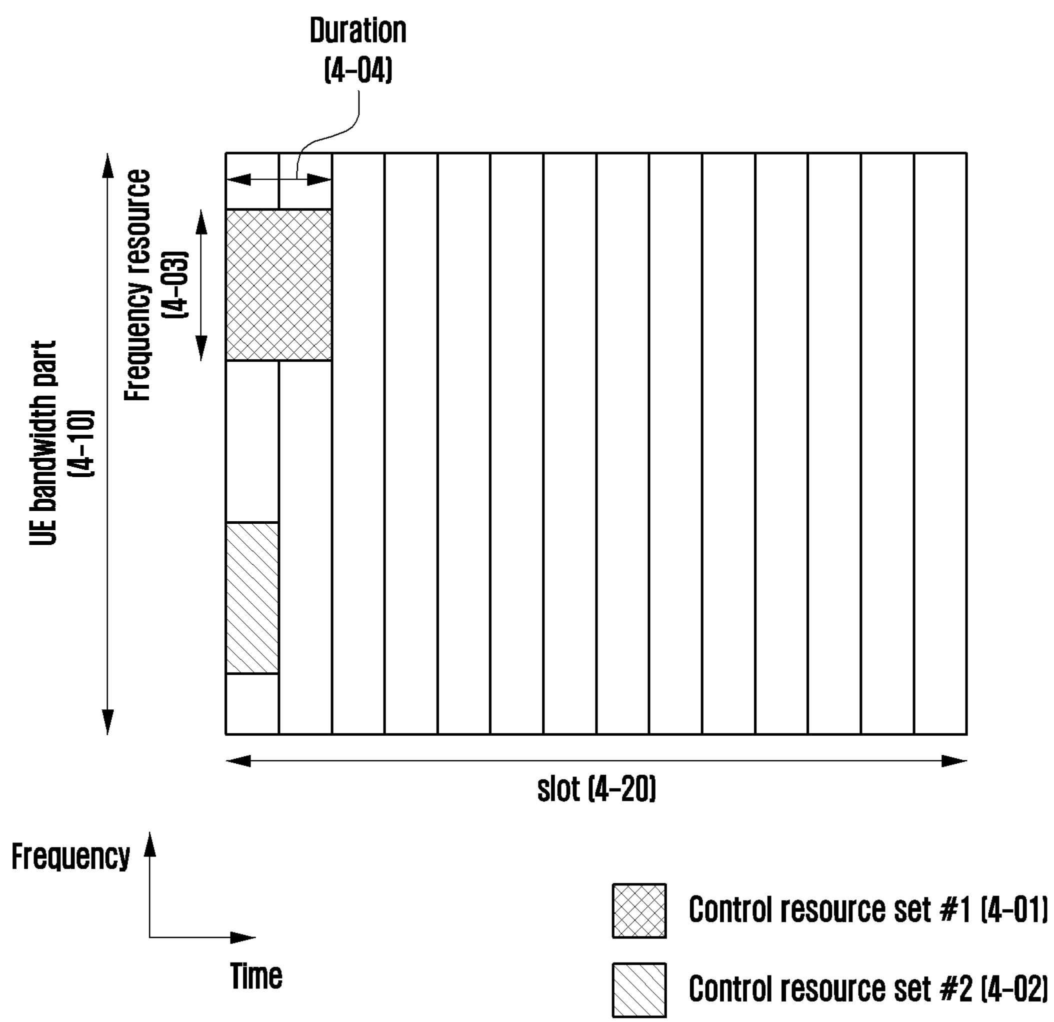
FIG. 4 illustrates an example of the configuration of a control resource set of a downlink control channel in a wireless communication system according to an embodiment of the disclosure.

FIG. 4 illustrates an example of the configuration of a control resource set of a downlink control channel in a wireless communication system according to an embodiment of the disclosure. FIG. 4 illustrates an embodiment of a control resource set (CORESET) through which a downlink control channel is transmitted in a 5G wireless communication system according to an embodiment of the disclosure.

Referring to FIG. 4, an embodiment, in which a UE bandwidth part 4-10 is configured in a frequency domain and two control resource sets (control resource set #1 4-01 and control resource set #2 4-02) are configured in one slot 4-20 in a time domain, is shown. The control resource sets 4-01 and 4-02 may be configured in a specific frequency resource 4-03 within the entire UE bandwidth part 4-10 in the frequency domain. The control resource sets 4-01 and 4-02 may be configured with one or multiple OFDM symbols in the time domain, and this may be defined as a control resource set duration 4-04. Referring to FIG. 4, the control resource set #1 4-01 may be configured with the control resource set duration of two symbols, and the control resource set #2 4-02 may be configured with the control resource set duration of one symbol.

The control resource set in the next generation mobile communication system (5G or NR system) described above may be configured by the base station performing higher layer signaling (e.g., system information, master information block (MIB), radio resource control (RRC) signaling) for the UE. Configuration of the control resource set for the UE may be understood as providing information such as a control resource set identity, a frequency location of the control resource set, a symbol length of the control resource set, and the like. The configuration of the control resource may include, for example, pieces of information of Table 8 below.

TABLE 8

```
ControlResourceSet ::=              SEQUENCE {
    -- Corresponds to L1 parameter 'CORESET-ID'
    controlResourceSetId            ControlResourceSetId,
  (Control resource set Identity)
    frequencyDomainResources        BIT STRING (SIZE (45)),
  (Frequency domain resource allocation information)
    duration                      INTEGER (1..maxCoReSetDuration),
  (Time domain resource allocation information)
    cce-REG-MappingType             CHOICE {
  (CCE-to-REG mapping type)
    interleaved                 SEQUENCE {
    reg-BundleSize                ENUMERATED {n2, n3, n6},
   (REG bundle size)
```

TABLE 8-continued

```
        precoderGranularity              ENUMERATED {sameAsREG-bundle,
    allContiguousRBs},
        interleaverSize                    ENUMERATED {n2, n3, n6}
        (Interleaver size)
        shiftIndex
        INTEGER(0..maxNrofPhysicalResourceBlocks-1)
          (Inverter Shift))
      },
        nonInterleaved                     NULL
        },
        tci-StatesPDCCH                  SEQUENCE(SIZE (1..maxNrofTCI-
    StatesPDCCH)) OF TCI-StateId         OPTIONAL,
      (QCL configuration information)
        tci-PresentInDCI                 ENUMERATED {enabled}
          }
```

In Table 8, tci-StatesPDCCH (hereinafter, referred to as "TCI state") configuration information may include information about a channel state information reference signal (CSI-RS) index or one or multiple synchronization signal (SS)/physical broadcast channel (PBCH) block indices having a quasi-co-located (QCLed) relationship with a demodulation reference signal (DMRS) transmitted in the corresponding control resource set.

In a wireless communication system, one or more different antenna ports (or can be replaced by one or more channels, signals, and combinations thereof, but in the description of the disclosure in the future, for convenience, collectively referred to as "different antenna ports") may be associated with each other by the QCL configuration as shown in Table 9 below.

TABLE 9

```
QCL-Info ::=            SEQUENCE {
    cell
                          ServCellIndex (QCL reference RS가 전송되는 서빙 셀
  인덱스)
    bwp-Id
                          BWP-Id (QCL references RS 가 전송되는 대역폭 부분
  인덱스)
    referenceSignal     CHOICE { (CSI-RSRS 혹은 SS PBCH block 중 하나를 QCL
  reference RS를 지시하는 지시자)
      csi-rs                    NZP-CSI-RS-ResourceId,
      ssb                         SSB-Index
    },
    qcl-Type              ENUMERATED {typeA, typeB, typeC, typeD}, (QCL type
  지시자)
    ...
}
```

Specifically, in the QCL configuration, two different antenna ports may be connected in a relationship between a (QCL) target antenna port and a (QCL) reference antenna port, and the UE may apply (or assume) all or part of statistical characteristics (e.g., large scale parameters of a channel, such as Doppler shift, Doppler spread, average delay, delay spread, average gain, and spatial Rx (or Tx) parameters, and reception spatial filter coefficients or transmission spatial filter coefficients of the UE) upon reception through the target antenna port. In the above, the target antenna port refers to an antenna port for transmitting a channel or signal, configured by a higher layer configuration including the QCL configuration, or an antenna port for transmitting a channel or signal to which a TCI state indicating the QCL configuration is applied. In the above, the reference antenna port refers to an antenna port for transmitting a channel or signal indicated (specified) by the referenceSignal parameter in the QCL configuration.

Specifically, the statistical characteristics of a channel defined by the QCL configuration (indicated by a parameter qcl-Type in the QCL configuration) may be classified as follows according to the QCL type.

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

Here, although the QCL types are not limited to the above four types, not all possible combinations are listed in order not to obscure the gist of the description. In the above, QCL-TypeA is a QCL type used when all statistical characteristics measurable in the frequency and time axes can be referenced since both the bandwidth and transmission interval of the target antenna port are sufficient compared to those of the reference antenna port (that is, in case that the number of samples and the transmission band/time of the target antenna port on both the frequency axis and the time axis are greater than the number of samples and the transmission band/time of the reference antenna port). QCL-TypeB is a QCL type used when the bandwidth of the target antenna port is sufficient to measure statistical characteristics, which are measurable on the frequency axis, that is, Doppler shift and Doppler spreads. QCL-TypeC is a QCL type used when only first-order statistics, that is, Doppler shift and average delay can be referenced since the bandwidth and transmission interval of the target antenna port are insufficient to measure second-order statistics, that is, Doppler spread and delay spreads. QCL-TypeD is a QCL type configured when spatial reception filter values used when receiving the reference antenna port can be used when receiving the target antenna port.

On the other hand, the base station can configure or indicate to two QCL configurations in one target antenna port through the following TCI state configuration as shown in Table 10.

TABLE 10

```
TCI-State ::=            SEQUENCE {
     tci-StateId           TCI-StateId, (TCI state 지시자)
     qcl-Type1               QCL-Info (해당 TCI state
                         가 적용되는 target안테나
 포트에 대한 첫 번째 QCL
설정
     qcl-Type2               QCL-Info (설정 TCI state 가 적용되는 tar-
                         get안테나
  포트에 대한 두 번째 QCL      OPTIONAL,   -- Need R
설정)
     ...
}
```

The first QCL configuration among two QCL configurations included in one TCI state configuration may be configured to be one of QCL-TypeA, QCL-TypeB, and QCL-TypeC. Here, the configurable QCL type is specified according to the types of the target antenna port and the reference antenna port, and will be described in detail below. In addition, the second QCL configuration among two QCL configurations included in the one TCI state configuration may be configured to be QCL-TypeD, and may be omitted in some cases.

Tables 11 to 15 below are tables showing valid TCI state configurations according to the types of target antenna port.

Table 11 shows valid TCI state configurations when a target antenna port is CSI-RS for tracking (TRS). The TRS refers to an NZP CSI-RS, in which a repetition parameter is not configured and trs-Info is configured to true, among CSI-RSs. The configuration of No. 3 in Table 11 can be used for aperiodic TRS.

Table 11 Valid TCI state configurations when a target antenna port is CSI-RS for tracking (TRS)

TABLE 11

| Valid TCI state Configuration | DL RS1 | qcl-Type1 | DL RS2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS(BM) | QCL-TypeD |
| 3 | TRS(periodic) | QCL-TypeA | TRS(same as DL RS 1) | QCL-TypeD |

Table 12 shows valid TCI state configurations when a target antenna port is CSI-RS for CSI. The CSI-RS for CSI refers to an NZP CSI-RS, in which a repetition parameter is not configured and trs-Info is also not configured to true, among CSI-RSs.

Table 12 Valid TCI state configurations when a target antenna port is CSI-RS for CSI

TABLE 12

| Valid TCI state Configuration | DL RS1 | qcl-Type1 | DL RS2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS(same as DL RS 1) | QCL-TypeD |
| 4 | TRS | QCL-TypeB | | |

Table 13 shows valid TCI state configurations when the target antenna port is CSI-RS for beam management (the same meaning as BM, CSI-RS for L1 RSRP reporting). The CSI-RS for BM refers to an NZP CSI-RS, in which a repetition parameter is configured and has a value of On or Off, and trs-Info is not configured to true, among CSI-RSs.

Table 13 Valid TCI state configurations when a target antenna port is CSI-RS for BM (for L1 RSRP reporting)

TABLE 13

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS (same as 이 RS 1) | QCL-TypeD |
| 2 | TRS | QCL-TypeA | CSI-RS(BM) | QCL-TypeD |
| 3 | SS/PBCH Block | QCL-TypeC | SS/PBCH Block | QCL-TypeD |

Table 14 shows valid TCI state configurations when a target antenna port is PDCCH DMRS.

Table 14 Valid TCI state configuration when target antenna port is PDCCH DMRS

TABLE 14

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS (same as 이 RS 1) | QCL-TypeD |
| 2 | TRS | QCL-TypeA | CSI-RS(BM) | QCL-TypeD |
| 3 | CSI-RS (CSI) | QCL-TypeA | CSI-RS (same as DL RS 1) | QCL-TypeD |

Table 15 shows valid TCI state configurations when a target antenna port is PDSCH DMRS.

Table 15 Valid TCI state configurations when a target antenna port is PDSCH DMRS

TABLE 15

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS(BM) | QCL-TypeD |
| 3 | CSI-RS (CSI) | QCL-TypeA | CSI-RS (CSI) | QCL-TypeD |

In the representative QCL configuration method according to Tables 11 to 15, the target antenna port and the reference antenna port for each operation are configured and operated as "SSB"→"TRS"→"CSI-RS for CSI, or CSI-RS for BM, or PDCCH DMRS, or PDSCH DMRS". Through this, it is possible to help the reception operation of the UE by linking the statistical characteristics that can be measured from the SSB and the TRS to each antenna port.

Figure 5:
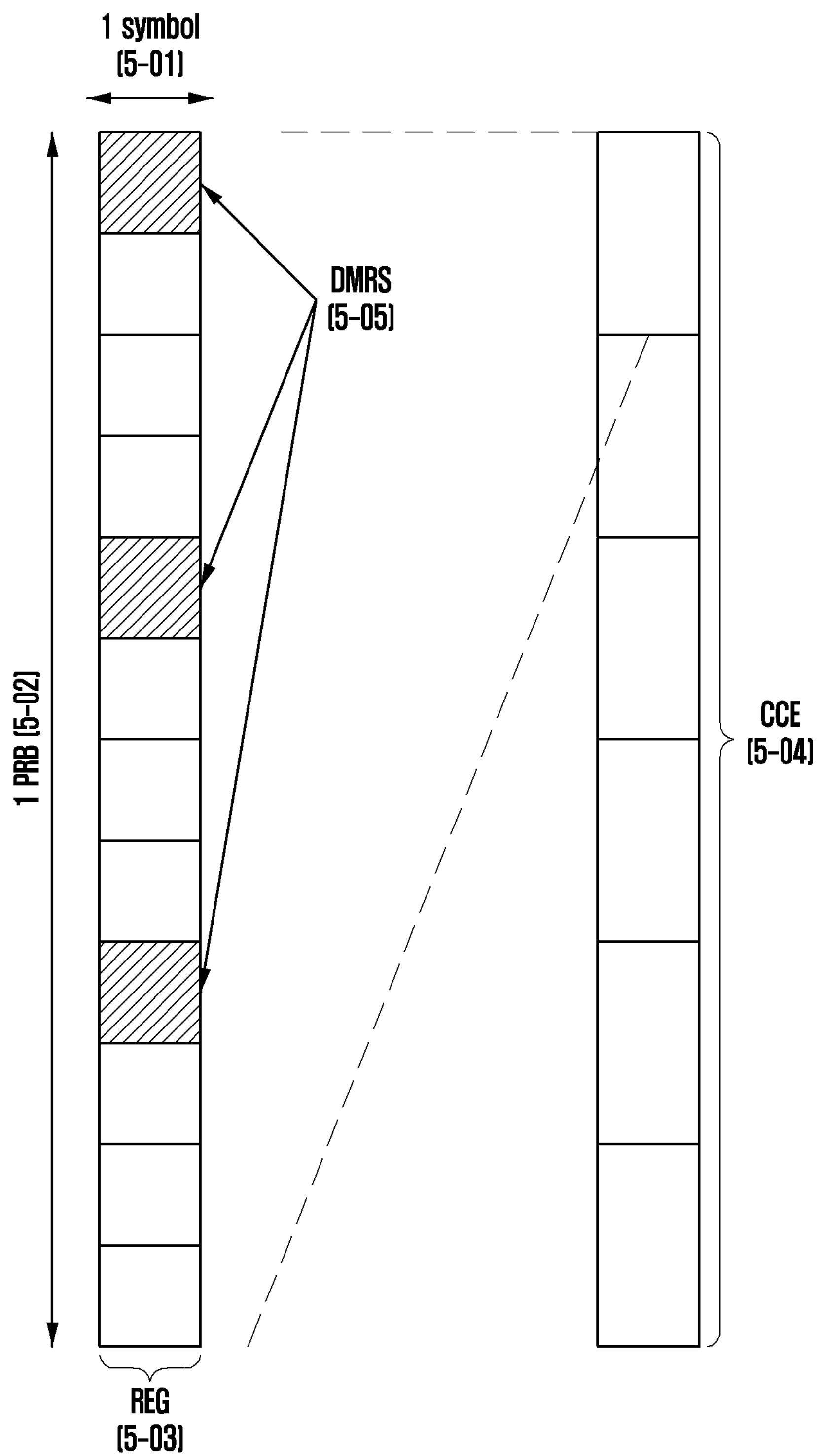
FIG. 5 illustrates a structure of a downlink control channel in a wireless communication system according to an embodiment of the disclosure.

FIG. 5 illustrates a structure of a downlink control channel in a wireless communication system according to an embodiment of the disclosure. That is, FIG. 5 illustrates an example of a basic unit of time and frequency resources configuring a downlink control channel that can be used in 5G according to an embodiment of the disclosure.

Referring to FIG. 5, the basic unit of time and frequency resources configuring a control channel may be defined as a resource element group (REG) 5-03. The REG 5-03 may be defined by 1 OFDM symbol 5-01 in a time domain and one physical resource block (PRB) 5-02, that is, 12 subcarriers, in a frequency domain. The base station may concatenate the REG 5-03 to configure a downlink control channel allocation unit.

As shown in FIG. 5, when a basic unit to which a downlink control channel is allocated in 5G is referred to as a control channel element (CCE) 5-04, 1 CCE 5-04 may include multiple REGs 5-03. For example, when the REG 5-03 may include 12 REs and 1 CCE 5-04 includes 6 REGs 5-03, shown in FIG. 5, 1 CCE 5-04 may include 72 REs. When the downlink control resource set is configured, the corresponding region may include multiple CCEs 5-04. A specific downlink control channel may be transmitted after being mapped to one or more CCEs 5-04 according to an aggregation level (AL) in the control resource set. The CCEs 5-04 in the control resource set are distinguished by numbers. Here, the numbers of the CCEs 5-04 may be assigned according to a logical mapping scheme.

The basic unit of the downlink control channel shown in FIG. 5, that is, the REG 5-03 may include both REs to which DCI is mapped and a region to which a DMRS 5-05 which is a reference signal for decoding the DCI is mapped. As shown in FIG. 5, three DMRSs 5-05 may be transmitted in 1 REG 5-03. The number of CCEs required for transmission of the PDCCH may be 1, 2, 4, 8, or 16 according to the aggregation level (AL). A different number of CCEs may be used to implement link adaptation of the downlink control channel. For example, in case that AL=L, one downlink control channel may be transmitted through L CCEs.

The UE needs to detect a signal in a state in which the UE does not know information about the downlink control channel, and a search space indicating a set of CCEs may be defined for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. According to an embodiment of the disclosure, a predetermined group of UEs or all the UEs may examine the common search space of the PDCCH in order to receive cell common control information, such as dynamic scheduling of system information or a paging message.

For example, the UE may receive PDSCH scheduling allocation information for transmission of the SIB including cell operator information and the like by examining the common search space of the PDCCH. In a case of the common search space, since a predetermined group of UEs or all the UEs need to receive the PDCCH, the common search space may be defined as a set of previously appointed CCEs. On the other hand, the UE may receive scheduling allocation information about the UE-specific PDSCH or PUSCH by examining the UE-specific search space of the PDCCH. The UE-specific search space may be UE-specifically defined as a function of the UE identity and various system parameters.

In 5G, the parameter for the search space of the PDCCH may be configured for the UE by the base station via higher layer signaling (e.g., SIB, MIB, and RRC signaling). For example, the base station may configure, in the UE, the number of PDCCH candidates at each aggregation level L, the monitoring periodicity for the search space, monitoring occasion of symbol units in the slots for the search space, the search space type (common search space or UE-specific search space), a combination of RNTI and DCI format to be monitored in the search space, a control resource set index to monitor the search space, and the like. For example, the configuration information described above may include the following pieces of information of Table 16 below.

TABLE 16

```
SearchSpace ::=                          SEQUENCE {
    -- Identity of the search space.     SearchSpaceId =0 identifies the
SearchSpace configured via PBCH (MIB) or ServingCellConfigCommon.
    searchSpaceId                            SearchSpaceId,
  (Search space identity)
    controlResourceSetId                     ControlResourceSetId,
  (Control resource set identity)
    monitoringSlotPeriodicityAndOffset          CHOICE {
  (Monitoring slot level period)
      sl1                                NULL,
      sl2                                INTEGER (0..1),
      sl4                                INTEGER (0..3),
      sl5                          INTEGER (0..4),
      sl8                                INTEGER (0..7),
```

TABLE 16-continued

```
      sl10                              INTEGER (0..9),
      sl16                              INTEGER (0..15),
      sl20                              INTEGER (0..19)
      }
      duration(Monitoring length)        INTEGER (2..2559)
      monitoringSymbolsWithinSlot              BIT STRING (SIZE (14))
      nrofCandidates                         SEQUENCE {
  (number of PDCCH candidates for each aggregation level)
      aggregationLevel1                 ENUMERATED {n0, nl, n2, n3, n4, n5,
n6, n8},
      aggregationLevel2                 ENUMERATED {n0, nl, n2, n3, n4, n5,
n6, n8},
      aggregationLevel4                 ENUMERATED {n0, nl, n2, n3, n4, n5,
n6, n8},
      aggregationLevel8                 ENUMERATED {n0, nl, n2, n3, n4, n5,
n6, n8},
      aggregationLevel16                ENUMERATED {n0, nl, n2, n3, n4, n5,
n6, n8}
      },
      searchSpaceType                        CHOICE {
      (Search space type)
      -- Configures this search space as common search space (CSS) and DCI
formats to monitor.
      common                                 SEQUENCE {
      (Common search space)
  }
      ue-Specific                       SEQUENCE {
      (UE-specific search space)
                    -- Indicates whether the UE monitors in this USS for DCI
formats 0-0 and 1-0 or for formats 0-1 and 1-1.
      formats                                ENUMERATED {formats0-0-And-
1-0, formats0-1-And-1-1},
      ...
      }
```

The base station may configure one or more search space sets for the UE according to configuration information. According to an embodiment of the disclosure, the base station may configure search space set 1 and search space set 2 in the UE. The base station may configure search space set 1 and search space set 2 in the UE, DCI format A scrambled by X-RNTI in the search space set 1 may be configured to be monitored in the common search space, DCI format B scrambled by Y-RNTI in the search space set 2 may be configured to be monitored in a UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

The common search space may be classified into a search space set of a specific type according to a purpose. An RNTI to be monitored may be different according to the determined type of search space set. For example, the common search space type, purpose, and RNTI to be monitored may be classified as Table 17 below.

TABLE 17

| Search space type | Purpose | RNTI |
|---|---|---|
| Type0 CSS | PDCCH transmission for SIB schedule | SI-RNTI |
| Type0A CSS | PDCCH transmission for SI schedule (SIB2 etc.) other than SIB1 | SI-RNTI |
| Type1 CSS | PDCCH transmission for random access response (RAR) schedule, Msg3 retransmission schedule, and Msg4 schedule | RA-RNTI, TC-RNTI |

TABLE 17-continued

| Search space type | Purpose | RNTI |
|---|---|---|
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | For PCell, PDCCH transmission for data schedule | C-RNTI, MCS-C-RNTI, CS-RNTI |

Meanwhile, in the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

Cell RNTI (C-RNTI): For UE-specific PDSCH scheduling

Temporary Cell RNTI (TC-RNTI): For UE-specific PDSCH scheduling

Configured Scheduling RNTI (CS-RNTI): For semi-statically configured UE-specific PDSCH scheduling Random access RNTI (RA-RNTI): For PDSCH scheduling in random access operation Paging RNTI (P-RNTI): For scheduling of PDSCH through which paging is transmitted System information RNTI (SI-RNTI): For PDSCH scheduling in which system information is transmitted Interruption RNTI (INT-RNTI): For notifying of whether to puncture PDSCH Transmit power control for PUSCH RNTI (TPC-PUSCH-RNTI): For indication of power control command for PUSCH Transmit power control for PUCCH RNTI (TPC-PUCCH-RNTI): For indication of power control command for PUCCH Transmit power control for SRS RNTI (TPC-SRS-RNTI): For indication of power control command for SRS In an embodiment, the above-described DCI formats may be defined as shown in Table 18 below.

TABLE 18

| DCI format | Usage |
|---|---|
| 0_0 | Schedulmig of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in 5G, multiple search space sets may be configured with different parameters (e.g., parameters in Table 16). Accordingly, the set of search space sets monitored by the UE may differ at each time point. For example, in case that search space set #1 is configured with a X-slot period, search space set #2 is configured with a Y-slot period, and X and Y are different, the UE may monitor both search space set #1 and space set #2 in a specific slot, and may monitor one of search space set #1 and search space set #2 in a specific slot.

When a plurality of search space sets are configured for the UE, the following conditions may be considered in order to determine the search space set to be monitored by the UE.

[Condition 1: Limit the Maximum Number of PDCCH Candidates]

The number of PDCCH candidates that can be monitored per slot may not exceed $M^\mu$. The $M^\mu$ may be defined as the maximum number of PDCCH candidates per slot in a cell configured to a subcarrier spacing of $15 \cdot 2^\mu$ kHz, and may be defined as shown in Table 19 below.

TABLE 19

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Maximum Number of CCEs]

The number of CCEs configuring the entire search space per slot (here, the entire search space may denote the entire set of CCEs corresponding to the union region of multiple search space sets) may not exceed $C^\mu$. The $C^\mu$ may be defined as the maximum number of CCEs per slot in a cell configured to a subcarrier spacing of $15 \cdot 2^\mu$ kHz, and may be defined as shown in Table 20 below.

TABLE 20

| μ | Maximum number of CCEs per slot and per serving cell ($C^\mu$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of the above conditions 1 and 2.

According to the configuration of the search space sets of the base station, a case in which condition A is not satisfied at a specific time point may occur. If condition A is not satisfied at a specific time point, the UE may select and monitor only some of the search space sets configured to satisfy condition A at the corresponding time point, and the base station may transmit PDCCH to the selected search space sets.

According to an embodiment of the disclosure, a method of selecting some search spaces in the entire configured search space set may conform to the following method.

[Method 1]

If condition A for PDCCH is not satisfied at a specific time point (slot), the UE (or base station) may select a search space set, in which a search space type is configured as a common search space, from among search space sets existing at a corresponding time point, preferentially over a search space set in which a search space type is configured as a UE-specific search space.

If all search space sets configured as common search spaces are selected (i.e., if condition A is satisfied even after all search spaces configured as common search spaces are selected), the UE (or base station) may select the search space sets configured as UE-specific search spaces. Here, if there are multiple search space sets configured as the UE-specific search spaces, a search space set having a low search space set index may have a higher priority. In consideration of the priority, the UE or base station may select the UE-specific search space sets within a range in which condition A is satisfied.

Methods of allocating time and frequency resources for data transmission in NR are described below.

In NR, the following detailed frequency domain resource allocation (FD-RA) methods may be provided in addition to frequency-domain resource candidate allocation through BWP indication.

Figure 6:
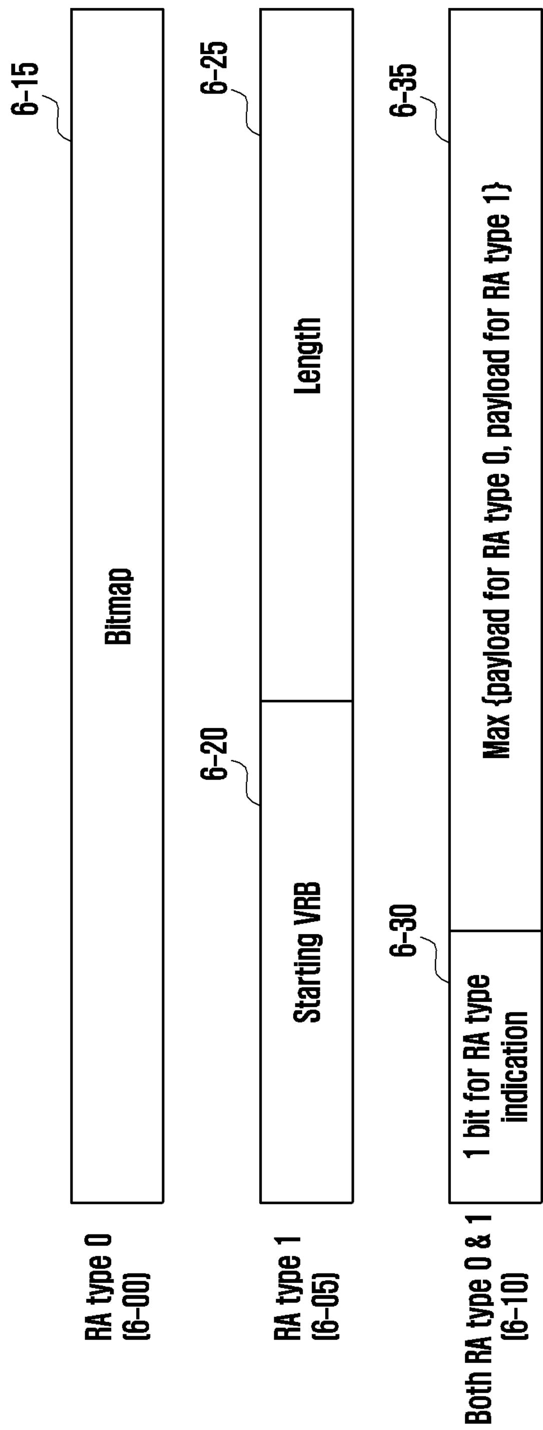
FIG. 6 illustrates an example of frequency-domain resource allocation of a physical downlink shared channel (PDSCH) in a wireless communication system according to an embodiment of the disclosure.

FIG. 6 illustrates an example of frequency-domain resource allocation of a physical downlink shared channel (PDSCH) in a wireless communication system according to an embodiment of the disclosure.

FIG. 6 shows three frequency-domain resource allocation methods of type 0 (6-00), type 1 (6-05), and dynamic switch (6-10) configurable through a higher layer in NR.

Referring to FIG. 6, in case that a UE is configured to use only resource type 0 via higher layer signaling (indicated by reference numeral 6-00), some downlink control information (DCI) for allocation of PDSCH to the corresponding UE includes a bitmap configured by NRBG bits. Conditions for this will be described again later. Here, NRBG denotes the number of resource block groups (RBGs) determined as shown in Table 21 below according to a BWP size allocated by a BWP indicator and a higher layer parameter rbg-Size, and data is transmitted to RBG indicated as "1" by the bitmap.

TABLE 21

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (indicated by reference numeral 6-05), some DCI for allocation of the PDSCH to the UE includes frequency-domain resource allocation information configured by $\lceil \log_2(N_{RB}^{DL,BWP}(N_{RB}^{DL,BWP}+1)/2 \rceil$ bits. Conditions for this will be described again later. Through this information, the base station may configure a starting VRB 6-20 and the length of frequency-domain resources 6-25 continuously allocated therefrom.

In case that the UE is configured to use both resource type 0 and resource type 1 via higher layer signaling (indicated by reference numeral 6-10), some DCI for allocation of PDSCH to the UE includes frequency-domain resource allocation information configured by bits of a greater value 6-35 among a payload 6-15 for configuration of resource type 0 and payloads 6-20 and 6-25 for configuration of resource type 1, a condition for which will be described later. Here, one bit 6-30 may be added to the most significant bit (MSB) of the frequency-domain resource allocation information in the DCI, when the corresponding bit has a value of 0, it may indicate that resource type 0 is used, and when the corresponding bit has a value of 1, it may indicate that resource type 1 is used.

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). With regard to PDSCH, a table including maxNrofDL−Allocations=16 entries may be configured, and with regard to PUSCH, a table including maxNrofUL−Allocations=16 entries may be configured. In an embodiment, the time-domain resource allocation information may include PDCCH-to-PDSCH slot timing (corresponding to a time gap in slot units between a time point of receiving a PDCCH and a time point of transmitting a PDSCH scheduled by the received PDCCH, and marked as K0), PDCCH-to-PUSCH slot timing (corresponding to a time gap in slot units between a time point of receiving a PDCCH and a time point of transmitting a PUSCH scheduled by the received PDCCH, and marked as K2), information on the position and length of a start symbol in which the PDSCH or PUSCH is scheduled within a slot, a mapping type of PDSCH or PUSCH, and the like. For example, information such as Table 22 or Table 23 below may be transmitted from the base station to the UE.

TABLE 22

PDSCH-TimeDomainResourceAllocationList information element

```
PDSCH-TimeDomainResourceAllocationList        ::=   SEQUENCE  (SIZE(1..maxNrofDL-Allocations)) OF
PDSCH-TimeDomainResourceAllocation
PDSCH-TimeDomainResourceAllocation    ::=     SEQUENCE {
    k0                                                                          INTEGER(0..32
OPTIONAL, -- Need S
    (PDCCH-to-PDSCH 타이밍, 슬롯 단위
    mappingType                                ENUMERATED {typeA, typeB),
    (PDSCH 매핑 타입
    startSymbolAndLength                          INTEGER (0..127)
    ( PDSCH 의 시작 심볼 및 길이)
}
```

TABLE 23

PDSCH-TimeDomainResourceAllocationList information element

```
PDSCH-TimeDomainResourceAllocationList        ::=   SEQUENCE     (SIZE(1..maxNrofUL-Allocations)) OF
PDSCH-TimeDomainResourceAllocation
```

TABLE 23-continued

PDSCH-TimeDomainResourceAllocationList information element

```
PDSCH-TimeDomainResourceAllocation    ::=    SEQUENCE {
    k2                                  INTEGER(0..32                OPTIONAL, -- Need S
    (PDCCH-to-PDSCH 타이밍, 슬롯 단위
    mappingType                              ENUMERATED {typeA, typeB),
    (PDSCH 매핑 타입
    startSymbolAndLength                         INTEGER (0..127)
    ( PDSCH 의 시작 심볼 및 길이)
}
```

The base station may notify the UE of one of the entries in the above-described table regarding the time-domain resource allocation information to via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 7:
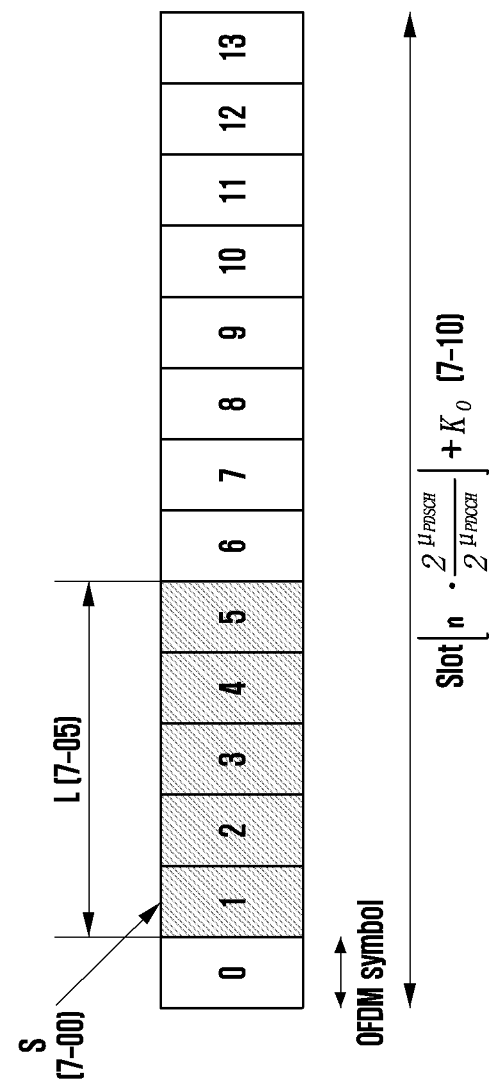
FIG. 7 illustrates an example of time-domain resource allocation of a PDSCH in a wireless communication system according to an embodiment of the disclosure.

FIG. 7 illustrates an example of time-domain resource allocation of a PDSCH in a wireless communication system according to an embodiment of the disclosure.

Referring to FIG. 7, a base station may indicate a time-domain position of a PDSCH resource according to a start position 7-00 and a length 7-05 of an OFDM symbol in one slot 7-10, dynamically indicated based on the subcarrier spacing (SCS) ($\mu_{PDSCH}$, $\mu_{PDCCH}$) of a data channel and a control channel configured using a higher layer, a scheduling offset ($K_0$) value, and DCI.

Figure 8:
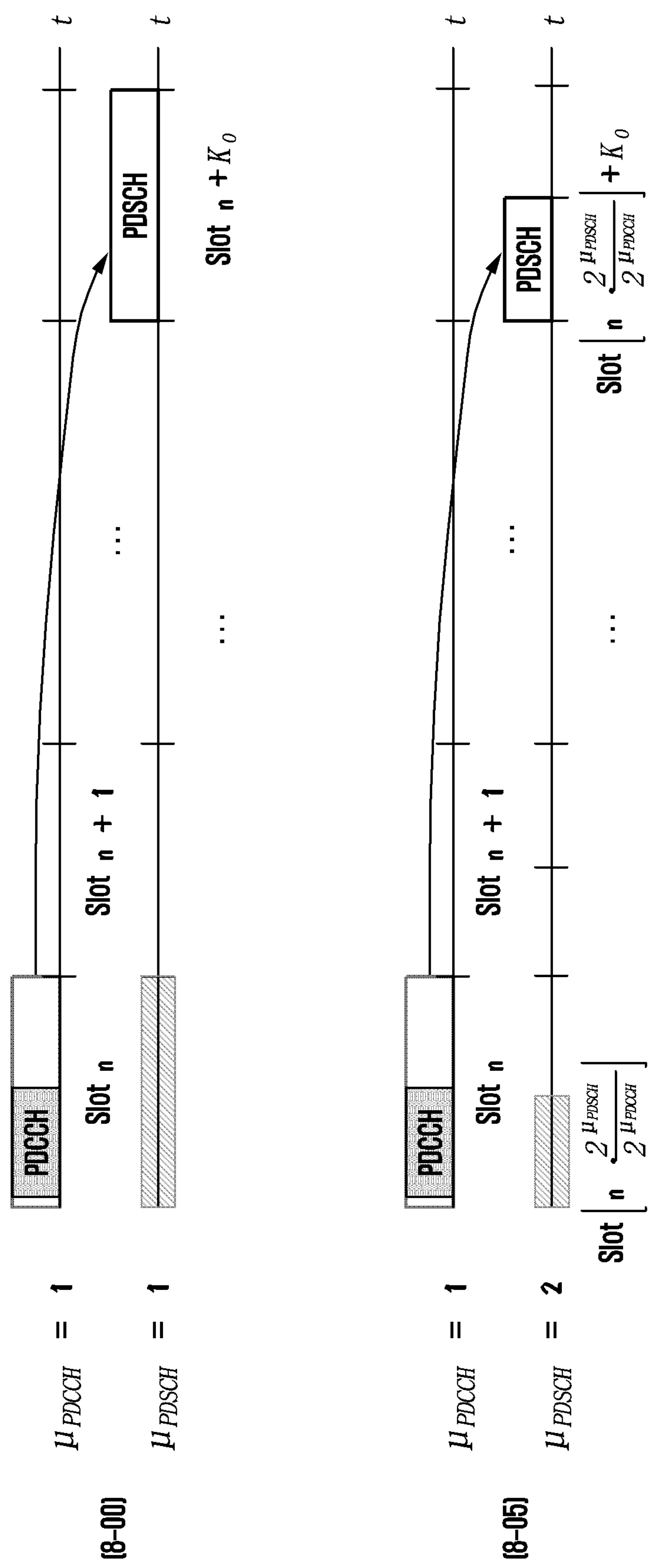
FIG. 8 illustrates an example of time-domain resource allocation according to a subcarrier spacing of a data channel and a control channel in a wireless communication system according to an embodiment of the disclosure.

FIG. 8 illustrates an example of time-domain resource allocation according to a subcarrier spacing of a data channel and a control channel in a wireless communication system according to an embodiment of the disclosure.

Referring to FIG. 8, if a data channel and a control channel have the same subcarrier spacing (8-00, $\mu_{PDSCH}=\mu_{PDCCH}$), since a data slot number and a control slot number are the same, a base station and a UE recognize that a scheduling offset occurs in accordance with predetermined slot offset $K_0$. On the other hand, when the subcarrier spacing of the data channel and the subcarrier spacing of the control) channel are different (8-05, $\mu_{PDSCH}\neq\mu_{PDCCH}$) a data slot number and a control slot number are different, and thus the base station and the UE recognize that a scheduling offset occurs in accordance with predetermined slot offset $K_0$ based on the subcarrier spacing of the PDCCH.

Next, a beam configuration method in which a base station transmits control information and data to a UE will be described. In the disclosure, for convenience of explanation, a process of transmitting control information through a PDCCH may be expressed as transmitting the PDCCH, and a process of transmitting data through a PDSCH may be expressed as transmitting the PDSCH.

First, a beam configuration method for a PDCCH will be described.

Figure 9:
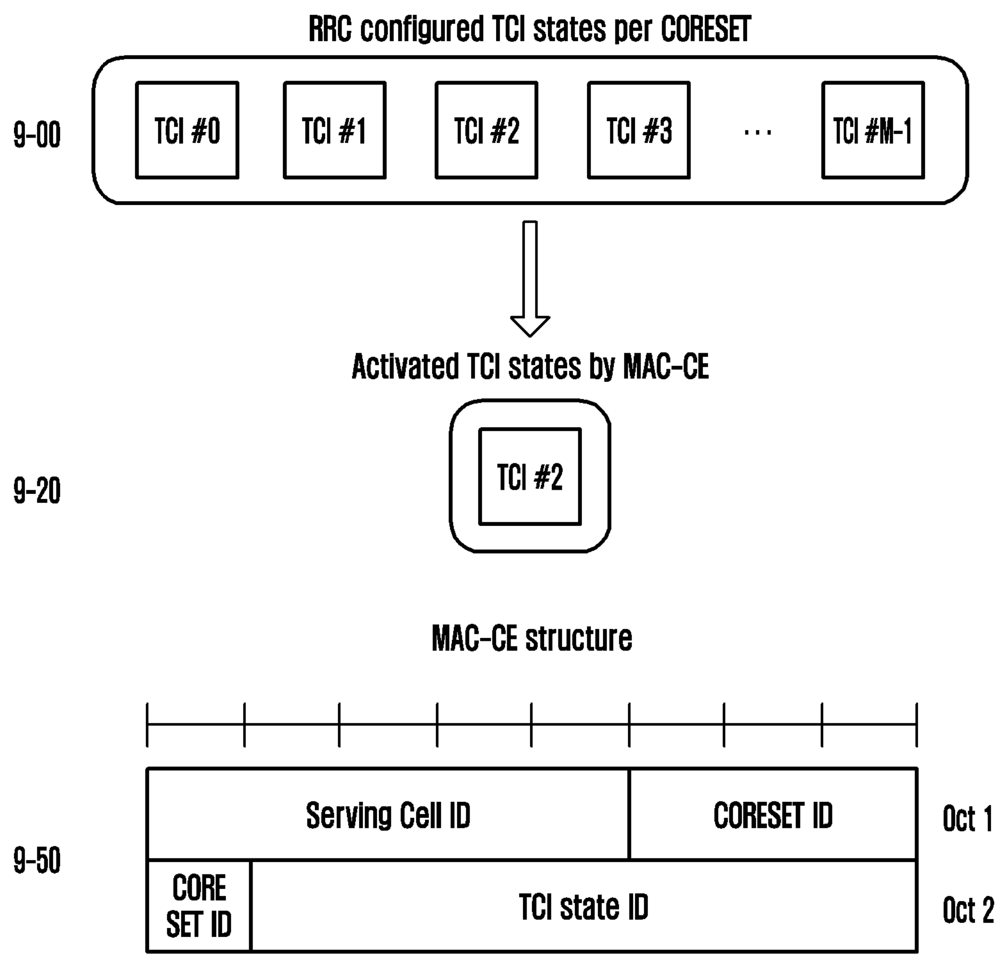
FIG. 9 illustrates a procedure for beam configuration and activation of a PDCCH according to an embodiment of the disclosure.

FIG. 9 shows a process for beam configuration and activation of a PDCCH according to an embodiment of the disclosure. Referring to FIG. 9, first, a list of TCI states for each CORESET may be indicated through a higher layer list such as RRC (indicated by reference numeral 9-00). The list of TCI states may be indicated by tci-StatesPDCCH-ToAddList and/or tci-StatesPDCCH-ToReleaseList of Table 8. Next, one of the list of the TCI states configured for each CORESET may be activated through an MAC-CE (indicated by reference numeral 9-20).

Reference numeral 9-50 shows an example of the MAC-CE structure for TCI state activation of the PDCCH. The meaning of each field in the MAC CE and values configurable for each field are shown in Table 24 below.

TABLE 24

Serving Cell ID (serving cell identity): This field indicates the identity of the Serving Cell for which the MAC CE applies. The length of the field is 5 bits;

CORESET ID(CORESET identity): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID(Transmission configuration indication identity): This field indicates the TCI state identified by TCI-StateId as specified in TS 38.331 [5]applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Next, a beam configuration method for a PDSCH will be described.

Figure 10A:
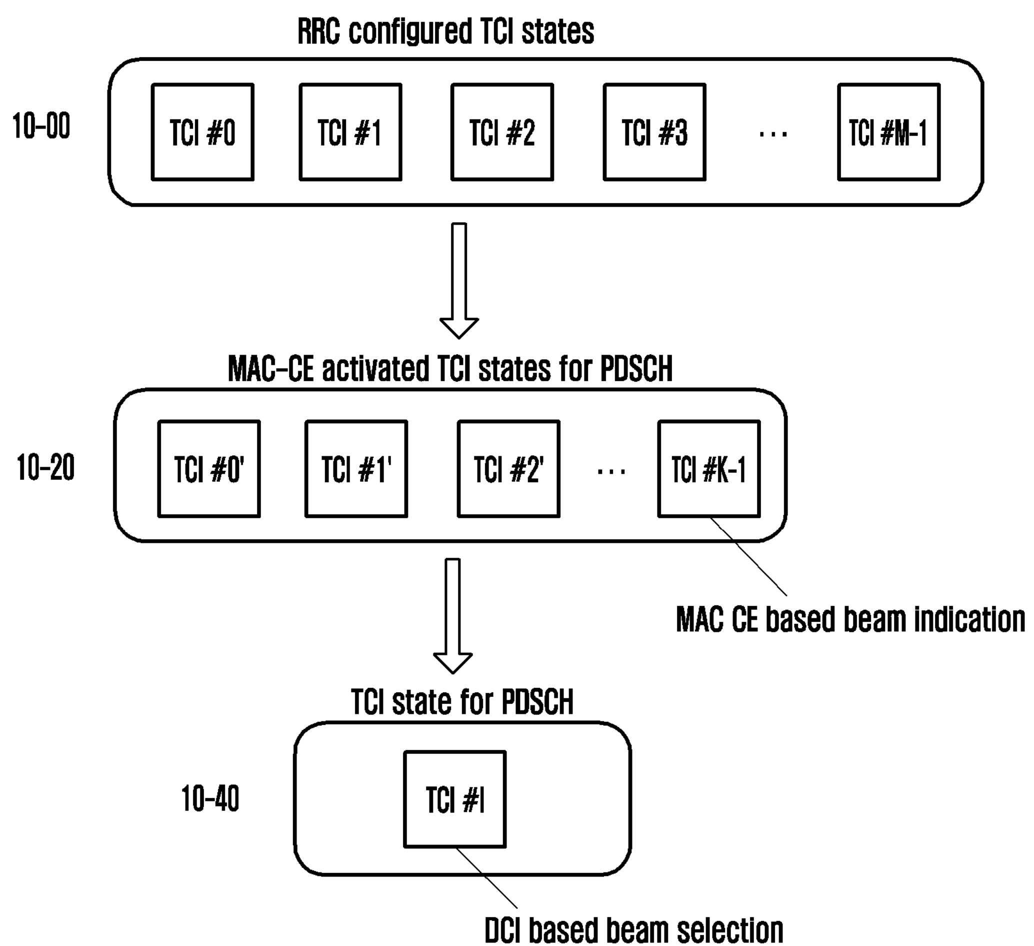
FIG. 10A illustrates a procedure for beam configuration and activation of a PDSCH according to an embodiment of the disclosure.
Figure 10B:
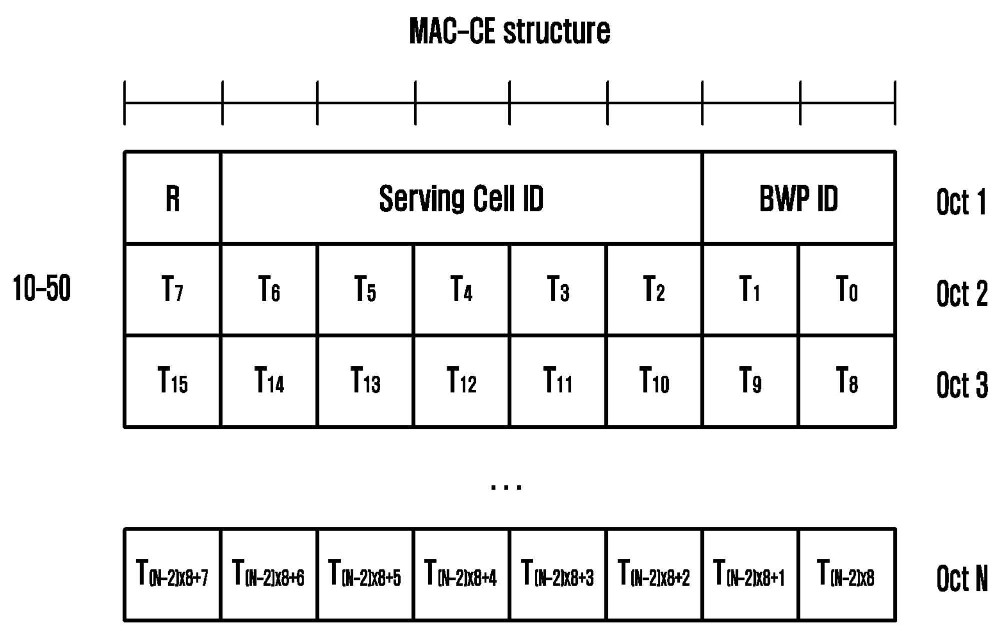
FIG. 10B illustrates a procedure for beam configuration and activation of a PDSCH according to an embodiment of the disclosure.

FIG. 10A illustrates a process for beam configuration and activation of a PDSCH according to an embodiment of the disclosure. FIG. 10B illustrates a process for beam configuration and activation of a PDSCH according to an embodiment of the disclosure.

Referring to FIG. 10A, a list of TCI states for a PDSCH may be indicated through a higher layer list such as RRC (indicated by reference numeral 10-00). The list of TCI states may be indicated by, for example, tci-StatesToAddModList and/or tci-StatesToReleaseList in PDSCH-Config IE for each BWP. Next, a part of the list of the TCI states may be activated through the MAC-CE (indicated by reference numeral 10-20). The maximum number of activated TCI states may be determined according to the capability reported by a UE.

Referring to FIG. 10B, reference numeral 10-50 show an example of a MAC-CE structure for TCI state activation/deactivation of a Rel-15-based PDSCH.

The meaning of each field in the MAC CE and values configurable for each field are shown in Table 25 below.

TABLE 25

| |
|---|
| Serving Cell ID (serving cell identity): This field indicates the identity of the Serving Cell for which the MAC CE applies. The length of the field is 5 bits; |
| BWP ID(Bandwidth Part identity): This field indicates a DL BWP for which the MAC CE applies as the codepoint of the DCI bandwidth part indicator field as specified in TS 38.212 [9]. The length of the BWP ID field is 2 bits; |
| Ti (TCI state identity i): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with Ti field set to 1 shall be mapped to the codepoint value 0, second TCI State with Ti field set to 1 shall be mapped to the codepoint value 1 and so on. The maximum number of activated TCI states is 8; |
| R (redundant bit): Reserved bit, set to 0. |

When receiving DCI format 1_1 or DCI format 1_2, the UE may receive a PDSCH through one beam of the TCI states activated by the MAC-CE based on information of a transmission configuration indication (TCI) field in DCI (indicated by reference numeral 10-40). Whether the TCI field exists is determined by a tci-PresentinDCI value, which is a higher layer parameter in a CORESET configured for reception of the DCI. If tci-PresentinDCI is configured to “enabled” in the higher layer, the UE may identify the TCI field of 3 bits information to determine TCI states activated according to a DL BWP or a scheduled component carrier and the direction of a beam linked to DL-RS.

In LTE and NR, the UE may perform a procedure of reporting the UE-supported capability to the corresponding base station while being connected to the serving base station. In the description below, this is referred to as a UE capability report. The base station may transmit a UE capability enquiry message requesting a capability report to the UE which is in a connected state. The message may include a UE capability request for each RAT type of the base station. The request for each RAT type may include requested frequency band information. Further, the UE capability enquiry message may make a request for multiple RAT types through one RRC message container, or the base station may transmit multiple UE capability enquiry messages including a request for each RAT type to the UE. That is, the UE capability enquiry may be repeated multiple times, and the UE may configure a UE capability information message corresponding to the repeated UE capability enquiry and make multiple reports of the UE capability information message. In the next generation telecommunication system, a UE capability request for MR-DC including NR, LTE, and EN-DC may be made. For reference, in general, the UE capability enquiry message is transmitted initially after the UE establishes a connection with a base station. However, the UE capability enquiry message may be requested by the base station under any condition if necessary.

In the above operation, the UE, which has received a request for a UE capability report from the base station, configures a UE capability according to frequency band information and a RAT type, which are requested by the base station. A method for configuring a UE capability by a UE in the NR system may be summarized as follows:

1. If the UE receives lists of LTE and/or NR frequency bands according to a UE capability request from a base station, the UE configures a band combination (BC) of EN-DC and NR stand-alone (SA). That is, the UE configures a candidate BC list for EN-DC and NR SA, based on frequency bands requested, through FreqBandList, from the base station. Further, the bands are prioritized in the order described in the FreqBandList.

2. If the base station requests the UE capability report by setting the “eutra-nr-only” flag or the “eutra” flag, matters relating to NR SA BCs among the configured BC candidate list are completely removed by the UE. This may occur only when the LTE base station (eNB) requests “eutra” capability.

3. Thereafter, the UE removes fallback BCs from the candidate BC list configured in the above operation. Here, the fallback BCs refer to BCs which is obtainable by removing a band corresponding to at least one SCell band from a random super set BC, and a fallback BC is omittable because a super set BC may already cover the fallback BC. This operation is further applied to MR-DC, i.e., LTE bands. The BCs remaining after performing this operation are included in the final “candidate BC list”.

4. The UE selects BCs to be reported by selecting BCs suitable for the requested RAT type from the final “candidate BC list”. In this operation, the UE configures supportedBandCombinationList in a predetermined order. That is, the UE configures BC and a UE capability to report according to a predetermined order of RAT type (nr→eutra-nr→eutra). Further, the UE configures featureSetCombination for the configured supportedBandCombinationList and configures a list of “candidate feature set combinations” from a candidate BC list from which a list of fallback BCs (including the same or lower level capabilities) has been removed. The above “candidate feature set combinations” include all of feature set combinations for NR and EUTRA-NA BC, and may be obtained from feature set combinations of containers of UE-NR-Capabilities and UE-MRDC-Capabilities.

5. Further, if the requested RAT type is eutra-nr and makes some influence, featureSetCombinations is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

Figure 11:
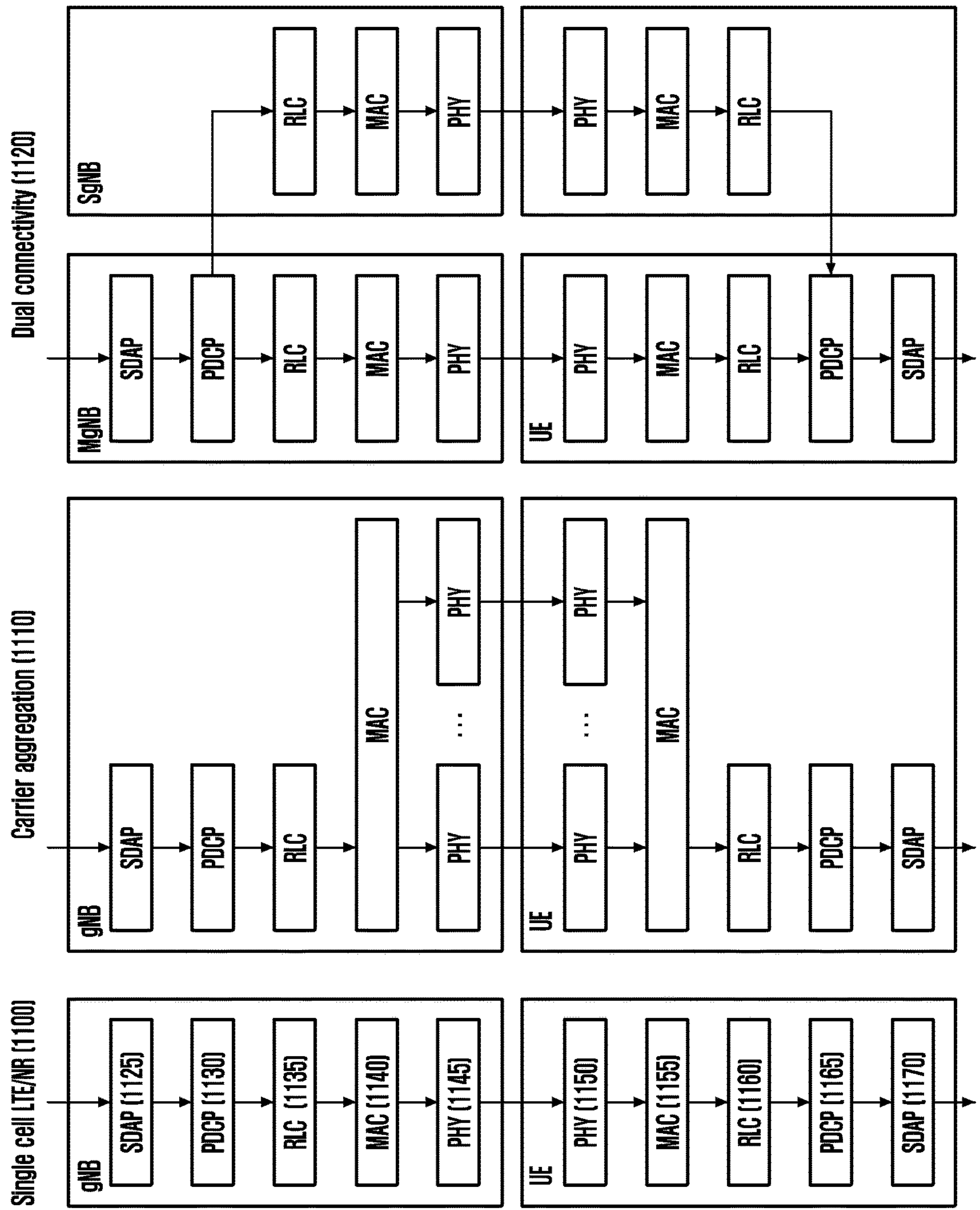
FIG. 11 illustrates a radio protocol structure of a base station and a UE in a single cell, carrier aggregation, and dual connectivity situation according to an embodiment of the disclosure.

FIG. 11 illustrates a radio protocol structure of a base station and a UE in a single cell, carrier aggregation, and dual connectivity situation according to an embodiment of the disclosure.

Referring to FIG. 11, the radio protocol of the next generation mobile communication system includes, for each of a UE and an NR base station, NR service data adaptation protocols (NR SDAPs) 1125 and 1170, NR packet data convergence protocols (NR PDCPs) 1130 and 1165, and NR radio link controls (NR RLCs) 1135 and 1160, and NR medium access control (NR MACs) 1140 and 1155.

The main functions of the NR SPAPs 1125 and 1170 may include some of the following functions:

Transfer of user plane data
Mapping between a QoS flow and a data bearer (DRB) for both DL and UL
Marking QoS flow ID in both DL and UL packets
Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The main functions of the NR PDCPs 1130 and 1165 may include some of the following functions:

Header compression and decompression: ROHC only
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in uplink In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 1135 and 1160 may include some of the following functions:

Transfer of higher layer PDUs
In-sequence delivery of higher layer PDUs
Out-of-sequence delivery of higher layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1140 and 1155 may be connected to multiple NR RLC layer devices configured in one UE, and the main functions of the NR MAC may include some of the following functions:

Mapping between logical channels and transport channels
Multiplexing/de-multiplexing of MAC SDUs
Scheduling information reporting
Error correction through HARQ
Priority handling between logical channels of one UE Priority handling between UEs by means of dynamic scheduling MBMS service identification Transport format selection Padding The NR PHY layers 1145 and 1150 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The detailed structure of the radio protocol structure may be variously changed according to a carrier (or cell) operating method. For example, when the base station performs single carrier (or cell)-based data transmission to the UE, the base station and the UE use a protocol structure, which has a single structure for each layer, such as 1100. On the other hand, when the base station transmits data to the UE based on carrier aggregation (CA) using multiple carriers in a single TRP, the base station and the UE has a single structure up to RLC but uses a protocol structure of multiplexing a PHY layer through a MAC layer, such as 1110. As another example, when the base station transmits data to the UE based on dual connectivity (DC) using multiple carriers in multiple TRP, the base station and the UE have a single structure up to RLC, but uses a protocol structure of multiplexing a PHY layer through a MAC layer, such as 1120.

In general, the UE is configured to receive scheduling for PDSCH reception or USCH transmission for delivering one or two TBs, through single DCI information. Hereinafter, the disclosure will be described under an assumption of PDSCH for convenience of explanation, but the disclosure may also be applicable to a PUSCH. In scheduling N PDSCHs, the above method can maximize the PDSCH reception performance of the UE by independently scheduling the N PDSCHs through different scheduling information for every PDSCH, that is, N DCIs. However, a problem may occur in which the UE consumes excessive power for DCI reception and/or the base station uses excessive resources for DCI transmission. For example, in a case of a UE requiring reception of 8 PDSCHs, the UE requires 8 number of times of PDCCH reception and decoding, and requires resources for transmission of the 8 PDCCHs. In case that single DCI information can be configured to schedule multiple PDSCH receptions (or PUSCH transmissions) for delivering multiple TBs (hereinafter, referred to as multi-PDSCH scheduling), power consumption and unnecessary resource use of the UE can be minimized.

Figure 12:
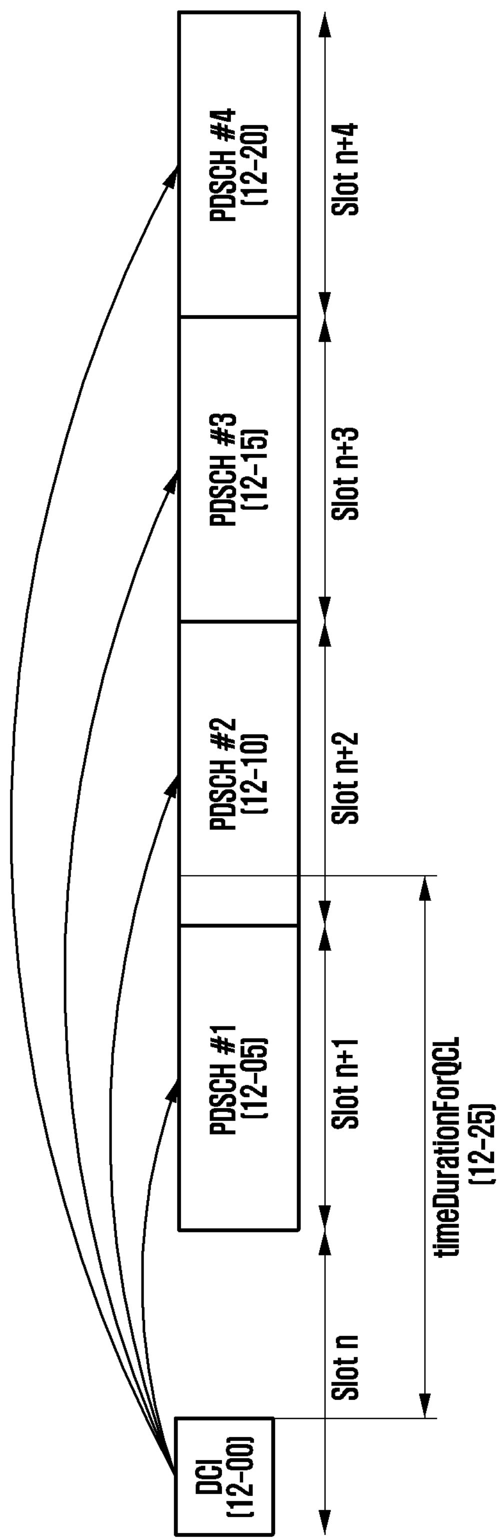
FIG. 12 illustrates multi-PDSCH scheduling according to an embodiment of the disclosure.

FIG. 12 illustrates the multi-PDSCH scheduling according to an embodiment of the disclosure. Single DCI 12-00 transmitted via the PDCCH is configured to schedule one or multiple PDSCHs 12-05, 12-10, 12-15, and 12-20. Each PDSCH may be configured to receive indication of a different slot offset for each PDSCH through DCI information, or only the first PDSCH may be configured to receive indication of a slot offset (K0). If only the first PDSCH is indicated with a slot offset, multiple PDSCHs may appear in consecutive slots. In addition, the PDSCHs may be scheduled with different SLIVs and mapping types on the time domain according to a TDRA table row index. Frequency resources may be used in the same manner. Each PDSCH may transmit one or more different TBs, or may repeatedly transmit the same TB. The UE reports timeDurationForQCL 12-25 to the base station according to capability transmission. According to the beam configuration operation for the PDSCH reception, a beam change or beam switching for reception occurs between PDSCH #2 12-10 and PDSCH #3 12-15.

In general, when the UE is configured to change a configured beam, the beam switching time may be ignored because it is smaller than the CP length. However, when the beam switching time of the UE is longer than the CP length (for example, when a very large subcarrier spacing such as 960 kHz is used), performance degradation may occur due to reduced received power and broken down of OFDM signal orthogonality. Accordingly, if the beam switching time is not considered in the above case, a problem may occur that the UE cannot normally receive some or all of the PDSCHs. Accordingly, the disclosure provides a beam configuration method considering a beam switching time of a UE during multi-PDSCH scheduling.

First Embodiment: Configuration of Multiple PDSCH Reception Beams when Single-Carrier Scheduling is Configured In a case where single DCI is configured to schedule one PDSCH, the number of symbols or a time gap (hereinafter, referred to as PDCCH-to-PDSCH time offset) may exist between the last symbol of a PDCCH having DCI indicating PDSCH scheduling and the start symbol of a PDSCH scheduled by DCI in the PDCCH. For example, the PDCCH-to-PDSCH time offset may be obtained by the summation of the number of symbols of the given slot offset (K0) and the PDSCH start symbol index. Another example, the PDCCH-to-PDSCH time offset may be obtained based on the number of symbols of the slot offset (K0), PDSCH start symbol index, and the number of allocated symbols for the PDCCH which the DCI is transmitted. For example, in case that the slot offset (K0) is 1 and the PDSCH start symbol (S) is 2 in the time domain resource assignment field of the downlink DCI (DCI format 1_0 or DCI format 1_1), and the PDCCH allocated to 3 symbols is detected in the first symbol of the slot, the PDCCH-to-PDSCH time offset may be 13. In case that the PDCCH-to-PDSCH time offset is less than a specific threshold, the UE may not be able to complete decoding of the PDCCH at the time of receiving the PDSCH. This denotes that beam information indicated by DCI of the PDCCH is not received, for PDSCH reception. In the above situation, the base station and the UE may designate a default beam for PDSCH reception. That is, in the above situation, the base station transmits the PDSCH via the designated default beam, and the UE performs buffering via the designated default beam. When the UE determines, after PDCCH decoding, that there is a PDSCH scheduled at a time point before PDCCH decoding, the UE may perform PDSCH decoding from a signal buffered according to the default beam. In this case, the above-described threshold may be a timeDurationForQCL value reported via UE capability. Meanwhile, the above-described default beam operation may be limited to a case in which one or more TCI states in the TCI state list 10-00 configured for the PDSCH include QCL-TypeD (that is, when the reception beam configuration of the UE is accompanied therewith). Here, the default beam may be a beam configured in the CORESET (e.g., CORESET #0) corresponding to the lowest ID among CORESETs corresponding to the monitored search space of the most recent slot based on the PDSCH reception slot.

Figure 13:
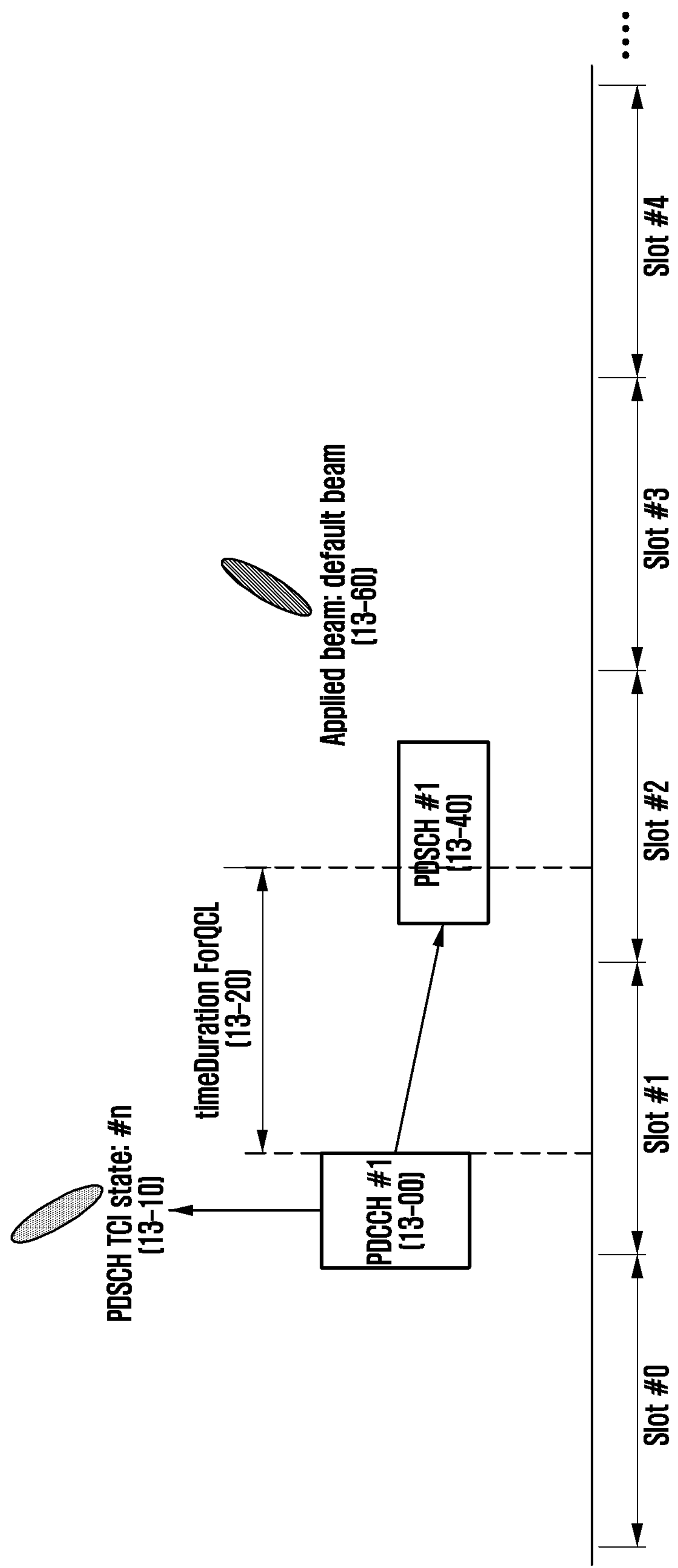
FIG. 13 illustrates an example of the operation of a PDSCH default beam according to an embodiment of the disclosure.

FIG. 13 illustrates an example of the operation of a PDSCH default beam according to an embodiment of the disclosure. In DCI transmitted via a PDCCH 13-00, when a TCI field for PDSCH reception indicates TCI state #n 13-10, if the PDCCH-to-PDSCH time offset is shorter than timeDurationforQCL 13-20, and one or more TCI states of the TCI state list configured via RRC for the PDSCH 13-40 include QCL-TypeD, a default beam 13-60 is applied to the PDSCH.

In case that the parameter tci-PresentinDCI in CORESET is not configured or the PDSCH is scheduled in DCI format 1_0, the UE does not receive a DCI indication of beam for PDSCH reception because the TCI field in DCI does not exist. Here, when the PDCCH-to-PDSCH time offset is equal to or greater than the timeDurationForQCL value, the UE assumes that the beam for PDSCH reception is the same as the beam configured/activated in CORESET for PDCCH transmission, and the base station may configure the PDSCH transmission beam based on the assumption of the UE.

When the parameter tci-PresentinDCI in CORESET is configured, the UE may recognize that the TCI field in DCI format 1_1 exists. If the PDCCH-to-PDSCH time offset is equal to or greater than the timeDurationForQCL value, the UE may configure a beam for PDSCH reception according to the indication of the TCI field in the detected DCI.

If the UE receives multi-PDSCH scheduling through single DCI information, the following situation may be assumed in the PDSCH reception TCI state/QCL assumption configuration. Here, the PDCCH-to-PDSCH time offset calculation may be divided into i) a case in which a slot offset is indicated with different values for each PDSCH, and ii) a case in which a slot offset is indicated only for the first PDSCH.

i) When a slot offset is indicated by a different value for each PDSCH, each PDSCH may have a different PDCCH-to-PDSCH time offset value. The PDCCH-to-PDSCH time offset according to the slot offset (K0) and the start symbol (S) of the PDSCH may be calculated as in Equation 1 below.

$$\mathrm{Min}(14*K0-\text{number of symbol for PDCCH},0)+S \qquad \text{Equation 1}$$

ii) When a slot offset is indicated only for the first PDSCH, the n-th PDSCH may obtain a PDCCH-to-PDSCH time offset by adding (n−1) slot to the slot offset. The PDCCH-to-PDSCH time offset according to the slot offset (K0) and the start symbol (S) of the PDSCH may be calculated as in Equation 2 below.

$$\mathrm{Min}(14*K0-\text{number of symbol for PDCCH},0)+14*(n-1)+S \qquad \text{Equation 2}$$

Situation 1) case in which the PDCCH-to-PDSCH time offset values of all PDSCHs are less than timeDurationForQCL In the above situation, since the PDCCH-to-PDSCH time offset values of all PDSCHs are less than timeDurationForQCL, the UE may receive multiple PDSCHs by using the default TCI state/QCL assumption configuration. Here, the default TCI state/QCL assumption configuration may use the QCL assumption with reference to the SSB and CSI-RS, may be the TCI state/QCL assumption applied to a CORESET (e.g., CORESET #0) corresponding to the lowest ID among CORESETs corresponding to the monitored search space of the most recent slot based on the PDSCH reception slot, and may be TCI corresponding to the lowest ID among applicable active TCI states.

Situation 2) case in which the PDCCH-to-PDSCH time offset values of all PDSCHs are equal to or greater than timeDurationForQCL In the above situation, when the PDCCH-to-PDSCH time offset values of all PDSCHs are equal to or greater than timeDurationForQCL, the UE may obtain QCL assumption by using the TCI state of a codepoint indicated by the TCI field in the DCI when the higher layer parameter tci-PresentInDCI is enabled. Here, the UE assumes DCI format 1_1. If there is no TCI field in DCI, the QCL assumption is assumed to be the same as the TCI state/QCL assumption configured/activated in CORESET used for PDCCH transmission, and the base station may configure the PDSCH transmission beam according to the assumption of the UE.

Situation 3) case in which the PDCCH-to-PDSCH time offset values of some PDSCHs among the multiple PDSCHs are less than timeDurationForQCL, and the PDCCH-to-PDSCH time offset values of the remaining PDSCHs are equal to or greater than timeDurationForQCL In the above situation, some PDSCHs 12-05 and 12-10 have PDCCH-to-PDSCH time offset values less than timeDurationForQCL 12-25, and the PDCCH-to-PDSCH time offset values of the remaining PDSCHs 12-15 and 12-20 are equal to or greater than the timeDurationForQCL. Since DCI decoding and PDSCH reception beam configuration complete are expected after timeDurationForQCL, the UE cannot use the TCI field in DCI before timeDurationForQCL. Therefore, PDSCH #1 12-05 and PDSCH #2 12-10, having the PDCCH-to-PDSCH time offset values less than timeDurationForQCL, can be received based on the default TCI state/QCL assumption configuration described in situation 1. On the other hand, the PDSCH #3 12-15, having the PDCCH-to-PDSCH time offset value equal to or greater than timeDurationForQCL, is ambiguous in configuration whether to receive based on default TCI state/QCL assumption configuration or by using the TCI field in DCI. When the TCI field in DCI is used, it is necessary to consider a beam switching time due to a change in the TCI state/QCL assumption configuration. Here, beam configurations for multiple PDSCHs may expect the following operations.

[Method 3-1]: Case in which the Above Situation is Avoided by Scheduling

The base station may prevent the above situation from occurring through PDSCH scheduling. For example, situation 1 may be generated by scheduling the PDCCH-to-PDSCH time offset values of all PDSCHs to be less than timeDurationForQCL through adjustment of the slot offset (K0) value or the adjustment of the start symbol (S) in the slot. Alternatively, situation 2 may be generated by scheduling the PDCCH-to-PDSCH time offset values of all PDSCHs to be equal to or greater than timeDurationForQCL. In this method, flexibility of scheduling may be reduced.

[Method 3-2]: Method in which Multiple PDSCHs Follow One TCI State/QCL Assumption Configuration If the PDCCH-to-PDSCH time offset value of at least one PDSCH is less than timeDurationForQCL, the UE may receive multiple PDSCHs by using the default TCI state/QCL assumption configuration described in situation 1. If the PDCCH-to-PDSCH time offset values of all PDSCHs are equal to or greater than timeDurationForQCL, the UE may receive multiple PDSCHs by using the TCI state/QCL assumption configuration described in situation 2.

[Method 3-3]: Direct Configuration Via Higher Layer Signaling

The UE may receive the TCI state/QCL assumption configuration via higher layer signaling. The UE may be assigned a TCI state in tci-StatesToAddModList and/or tci-StatesToReleaseList in PDSCH-Config IE for each BWP, which is a list of TCI states for PDSCH. For example, one TCI state may be designated for multiple PDSCHs. Alternatively, TCI states may be designated for respective PDSCHs. When beam switching occurs between receptions of respective PDSCHs and if necessary, a gap may be configured via higher layer signaling, or a gap between PDSCHs may be configured through scheduling.

[Method 3-4]: Beam Configuration According to Whether a Gap Exists or not

Figure 14:
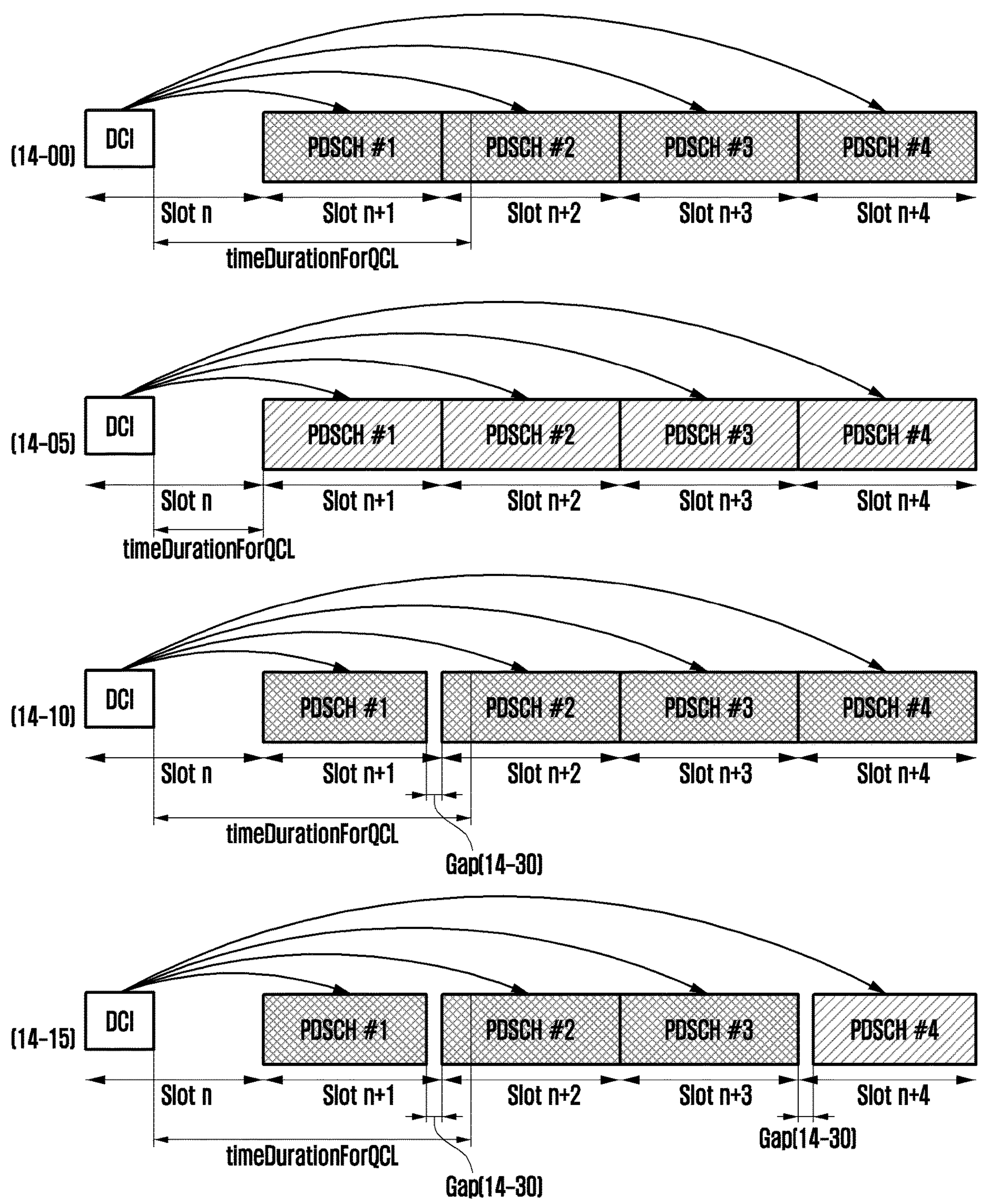
FIG. 14 illustrates an example of the operation of a plurality of PDSCH beams according to an embodiment of the disclosure.

FIG. 14 illustrates an example of the operation of a plurality of PDSCH beams according to an embodiment of the disclosure.

Referring to FIG. 14, in case that multiple PDSCHs are scheduled through single DCI, when all of the PDSCHs are time-consecutively allocated, that is, when there is no time gap between consecutive PDSCHs (indicated by reference numerals 14-00 and 14-05), When the first symbol of the first PDSCH scheduled through the DCI is located before timeDurationForQCL (indicated by reference numeral 14-00), the UE may receive all of the scheduled PDSCHs by assuming the default TCI state/QCL assumption (indicated by reference numeral 14-20) described in situation 1.

When the first symbol of the first PDSCH scheduled through the DCI is located at the same position as or after than timeDurationForQCL (indicated by reference numeral 14-05), the UE may receive all of the multiple PDSCHs by assuming the TCI state/QCL assumption (indicated by reference numeral 14-25) described in situation 2.

In case that at least one of the PDSCHs is non-consecutively allocated in time, that is, when at least one symbol gap 14-30 exists between consecutive PDSCHs (indicated by reference numerals 14-10 and 14-15), When there is at least one symbol gap between the PDSCHs scheduled through the DCI before timeDurationForQCL, and there is no symbol gap after timeDurationForQCL (indicated by reference numeral 14-10), the UE may receive all of the multiple PDSCHs by assuming the default TCI state/QCL assumption (indicated by reference numeral 14-20) described in situation 1.

When there is at least one symbol gap after timeDurationForQCL, regardless of whether there is a symbol gap between PDSCHs scheduled through the DCI before timeDurationForQCL (indicated by reference numeral 14-15), the UE may receive starting from the first PDSCH to the last symbol of the last PDSCH before the first symbol gap after timeDurationForQCL by assuming the default TCI state/QCL assumption (indicated by reference numeral 14-20) described in situation 1. In addition, the UE may receive starting from the first symbol of the first PDSCH after the first symbol gap after timeDurationForQCL to the last symbol of the last PDSCH, by assuming the TCI state/QCL assumption (indicated by reference numeral 14-25) described in situation 2.

Here, the first symbol of the first PDSCH among the PDSCHs may refer to one of the first symbol indicated through the time domain resource allocation field of DCI, a symbol used to transmit a cyclic prefix extension (CP extension) indicated through the DCI field (e.g., ChannelAccess-CPext), or a start time point of the CP extension.

Here, for convenience of explanation, a case in which at least one symbol gap 14-30 exists between consecutive PDSCHs has been described as an example of a case in which PDSCHs are non-consecutively allocated in time, but there is no limitation thereto. For example, when there is a beam switching time, which is reported by the UE to the base station through capability signaling, between consecutive PDSCHs, and/or symbol gap corresponding to the beam switching time, or when there is a time or symbol gap configured with the magnitude of the gap via higher signal signaling from the base station, the UE may determine that the PDSCH is non-consecutively allocated in time.

In connection with determining whether the symbol gap 14-30 exists, when a time gap is greater than threshold X, the symbol gap may be determined to be exist, and when the time gap is smaller than the threshold X, it may be determined that the symbol gap does not exist. The threshold X may be configured via higher layer signaling or DCI.

[Method 3-5]: Introduction of UE Capability and Beam Configuration

Figure 15:
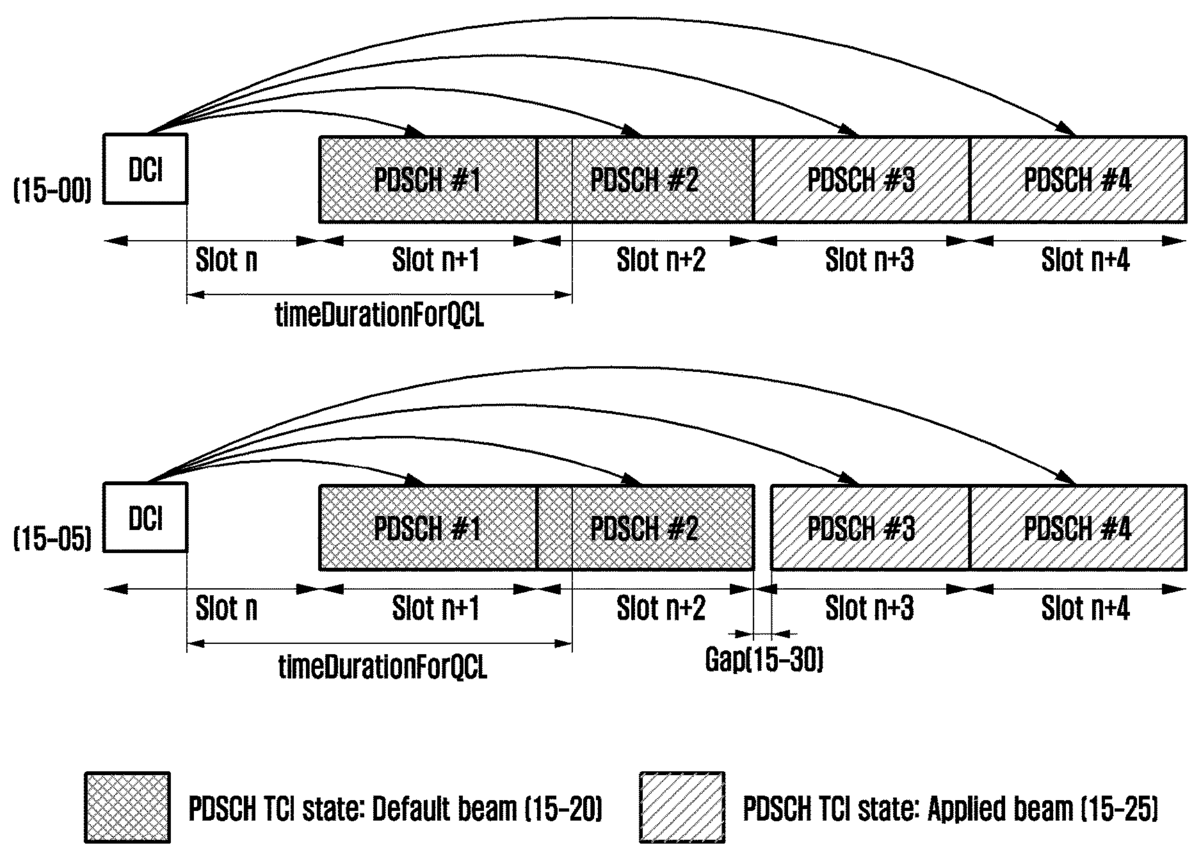
FIG. 15 illustrates an example of the operation of a plurality of PDSCH beams according to an embodiment of the disclosure.

FIG. 15 illustrates an example of the operation of a plurality of PDSCH beams according to an embodiment of the disclosure. Referring to FIG. 15, the UE compares the beam switching time and the length of CP, and notifies a network of the comparison result via at least 1-bit UE capability.

In case that the beam switching time required by the UE is equal to or smaller than the length of CP and thus the UE can perform beam change without a separate symbol gap 15-30 for separate beam switching (indicated by reference numeral 15-00), the UE may receive PDSCHs having a PDCCH-to-PDSCH time offset value less than timeDurationForQCL by assuming the default TCI state/QCL assumption (indicated by reference numeral 15-20) described in situation 1. In addition, the UE may receive PDSCHs having a PDCCH-to-PDSCH time offset value equal to or greater than timeDurationForQCL by assuming the TCI state/QCL assumption (indicated by reference numeral 15-25) described in situation 2. In the above description, for convenience of explanation, a case in which the PDSCH is time-continuously allocated has been described as an example, but there is no limitation thereto. For example, it is also applicable to a case in which at least one symbol gap 15-30 exists between discontinuous PDSCHs.

In case that the beam switching time required by the UE is greater than the length of CP and thus the separate symbol gap 15-30 for separate beam switching is required (indicated by reference numeral 15-05), the UE may receive PDSCHs having a PDCCH-to-PDSCH time offset value less than timeDurationForQCL by assuming the default TCI state/QCL assumption (indicated by reference numeral 15-20) described in situation 1. The UE may expect that a gap between the last symbol of the last PDSCH having a PDCCH-to-PDSCH time offset value less than timeDurationForQCL and the first symbol of the first PDSCH having a PDCCH-to-PDSCH time offset value equal to or greater than timeDurationForQCL is at least the separate symbol gap 15-30 or more. The separate symbol gap may be configured via higher layer signaling or DCI. PDSCHs after the separate symbol gap 15-30 may be received by assuming the TCI state/QCL assumption (indicated by reference numeral 15-25) described in situation 2. In the above description, gap other than the separate symbol gap 15-30 is not indicated for convenience of explanation, but there is no limitation thereto. For example, at least one gap may exist in addition to the separate symbol gap.

Second Embodiment: Configuration of Multiple PDSCH Reception Beams when Cross-Carrier Scheduling is Configured A cross-carrier scheduling configuration for a single slot PDSCH through single DCI information will be described.

For cross-carrier scheduling, a configuration parameter for each serving cell configured via RRC, that is, crossCarrierSchedulingConfig having the following structure in the ServingCellConfig IE configured for each serving cell/component carrier (CC) may be configured.

TABLE 26

```
CrossCarrierSchedulingConfiq ::=   SEQUENCE {
   schedulingCellInfo                 CHOICE {
     own                                   SEQUENCE {          -- Cross carrier
scheduling: scheduling cell
        cif-Presence                  BOOLEAN
     },
     other                                 SEQUENCE {          -- Cross carrier
scheduling: scheduled cell
        schedulingCellId              ServCellIndex,
        cif-InSchedglingCell             INTEGER (1...7)
     }
   ),
   . . . ,
   [[
   carrierIndicaterSize-r16       SEQUENCE {
     carrierIndicatorSizeDCI-2-r16          INTEGER (0..3),
     carrierIndicatorSizeDCI-0-2-r16        INTEGER (0..3)
   }                                                           OPTIONAL, --
Cond CIF-PRESENCE
   enabledDefaultBeamForCCS-r16                    ENUMERATED {enabled}
OPTIONAL -- Need S
   ]]
}
```

When cross-carrier scheduling is to be performed from a specific serving cell to another serving cell, the specific serving cell is called a scheduling cell for convenience, and the cif-Presence value within the own value of the crossCarrierSchedulingConfig parameter may be configured to true. Here, the carrier indicator field (CIF) described above in Table 26 may exist in DCI format 0_1 or 1_1 of the scheduling cell. When the value of 0 is indicated in the CIF field, the PDSCH scheduled in the DCI format is transmitted to the scheduling cell. Meanwhile, when a non-zero value is indicated in the CIF field, the PDSCH scheduled in the DCI format is transmitted to a serving cell other than the scheduling cell. A serving cell corresponding to a value of the CIF field is called a scheduled cell for convenience, and mapping between a specific scheduled cell and the CIF value may be made through the cif-InSchedulingCell value within the other value of the crossCarrierSchedulingConfig parameter. That is, in case that the cif-InSchedulingCell value in the ServingCellConfig of a specific scheduled cell is configured, the CIF field value in the DCI of the scheduling cell is configured to be the cif-InSchedulingCell value, and thus transmission of the PDSCH to the scheduled cell may be indicated to the UE. There may be one scheduling cell for the specific scheduled cell, and an indication of the scheduling cell for the specific scheduled cell may be performed by designating, as the ID of the scheduling cell, the schedulingCellId value within the other value of the crossCarrierSchedulingConfig parameter in ServingCellConfig for the scheduled cell.

In addition, for cross-carrier scheduling configuration, a search space set having the same ID needs to be configured between the active BWP of the scheduling cell and the active BWP of the scheduled cell.

When cross-carrier scheduling is configured for a specific serving cell as described above, the UE may recognize whether the scheduling cell and the scheduled cell are the same serving cell through the CIF value in the DCI field of the scheduling cell. On the other hand, when the scheduled cell is different from the scheduling cell, CORESET may not be configured in the scheduled cell. Here, when the assumption for the PDSCH default beam is different, the UE cannot normally receive the PDSCH.

To prevent this problem, it is possible to recognize whether the default beam is usable in the scheduled cell based on the configuration of enableDefaultBeamForCCS. If enableDefaultBeamForCCS is not configured, the UE may expect that the TCI field exists in DCI, one or more TCI states have QCL-typeD, and the PDCCH-to-PDSCH time offset value is equal to or greater than timeDurationForQCL. That is, the UE may always receive the PDSCH reception beam configuration by using the TCI state in the DCI.

In case that enableDefaultBeamForCCS is configured, referring to FIG. 8, when DCI and PDSCH have the same subcarrier spacing (8-00, $\mu_{PDSCH}=\mu_{PDCCH}$), since a data slot number and a control slot number are the same, the base station and the UE may expect a predetermined K0 value. On the other hand, when the subcarrier spacing of the DCI and the subcarrier spacing of the PDSCH are different (8-05, $\mu_{PDSCH}\neq\mu_{PDCCH}$), a data slot number and a control slot number are different, and thus the base station and the UE add a slot correction value $$\left(\left\lfloor n\frac{2^{\mu_{PDSCH}}}{2^{\mu_{PDCCH}}}\right\rfloor\right)$$

to the predetermined K0 value based on the subcarrier spacing of the PDCCH. The timeDurationForQCL, which is UE capability, may be configured in a similar manner. When enableDefaultBeamForCCS is configured, an additional timing delay value $$\left(d\frac{2^{\mu_{PDSCH}}}{2^{\mu_{PDCCH}}}\right)$$

defined in Table 27 below may be added to the determined timeDurationForQCL.

TABLE 27

| $\mu_{PDCCH}$ | d [PDCCH symbols] |
|---|---|
| 0 | 8 |
| 1 | 8 |
| 2 | 14 |

In both cases where there is no TCI field in the received DCI and the PDCCH-to-PDSCH time offset value of the PDSCH is less than timeDurationForQCL, the UE may receive the PDSCH by using the beam configuration corresponding to the lowest ID among the activated TCI states of the scheduled cell, as the default beam.

If the UE receives multi-PDSCH scheduling through single DCI information when cross-carrier scheduling is configured, the following situation may be assumed in the PDSCH reception TCI state/QCL assumption configuration.

Situation 1) case in which there is no default TCI state/QCL assumption configuration via higher layer signaling When there is no default TCI state/QCL assumption configuration via higher layer signaling, the UE may expect that the TCI field exists in DCI, one or multiple TCI states have QCL-typeD, and the PDCCH-to-PDSCH time offset value of the PDSCH is greater than timeDurationForQCL. That is, since the UE does not expect to receive the PDSCH by using the default TCI state/QCL assumption configuration, all of the multiple PDSCHs are expected to have a PDCCH-to-PDSCH time offset value equal to or greater than timeDurationForQCL, and may follow the TCI state configuration of a codepoint indicated by the TCI field in the received DCI.

Situation 2) case in which there is a default TCI state/QCL assumption configuration via higher layer signaling When there is a default TCI state/QCL assumption configuration via higher layer signaling, and when there is no TCI field in the received DCI or the PDSCH PDCCH-to-PDSCH time offset value is less than timeDurationForQCL, the UE may receive the PDSCH by using the default TCI state/QCL assumption configuration. Here, the default TCI state/QCL assumption may be a TCI state corresponding to the lowest ID among the active TCI states applicable to the PDSCH in the activated BWP of the scheduled cell.

Situation 2-1) case in which the PDCCH-to-PDSCH time offset values of all PDSCHs are less than timeDurationForQCL In the above situation, the UE may receive all PDSCHs by using the default TCI state/QCL assumption configuration described in situation 2.

Situation 2-2) case in which the PDCCH-to-PDSCH time offset values of all PDSCHs are equal to or greater than timeDurationForQCL In the above situation, when there is no TCI field in the received DCI, the UE may receive all PDSCHs by using the default TCI state/QCL assumption configuration described in situation 2. When there is a TCI field in the received DCI, the UE may receive all PDSCHs according to the TCI state configuration of a codepoint indicated by the TCI field in the received DCI.

Situation 2-3) case in which the PDCCH-to-PDSCH time offset values of some PDSCHs among the multiple PDSCHs are less than timeDurationForQCL, and the PDCCH-to-PDSCH time offset values of the remaining PDSCHs are equal to or greater than timeDurationForQCL In the above situation, when there is no TCI field in the received DCI, the UE may receive all PDSCHs by using the default TCI state/QCL assumption configuration described in situation 2. When there is a TCI field in the received DCI, the UE may configure TCI state/QCL assumption configurations for multiple PDSCH reception by using methods 3-1, 3-2, 3-3, 3-4, and 3-5 of the first embodiment.

Figure 16:
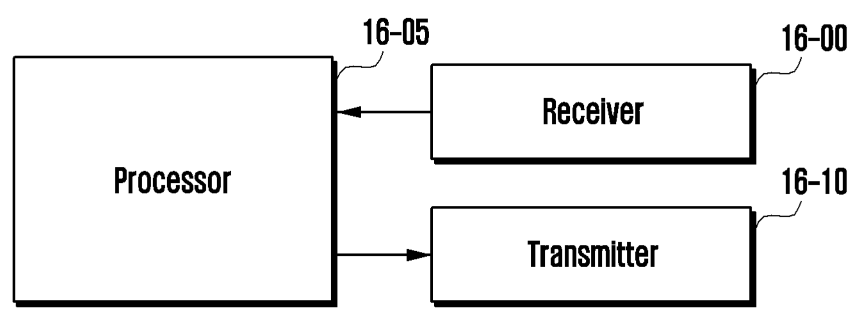
FIG. 16 illustrates the structure of a UE in a wireless communication system according to an embodiment of the disclosure.

FIG. 16 illustrates a structure of a UE in a wireless communication system according to an embodiment of the disclosure.

Referring to FIG. 16, the UE may include a UE receiver 16-00, a UE transmitter 16-10, and a UE processor (a controller) 16-05.

The UE receiver 16-00 and the UE transmitter 16-10 may be collectively called a transceiver. According to the communication method of the UE described above, the UE receiver 16-00, the UE transmitter 16-10, and the UE processor 16-05 of the UE may operate. However, the elements of the UE are not limited to the above-described examples. For example, the UE may include more or fewer elements (e.g., a memory and the like) than the aforementioned elements. In addition, the UE receiver 16-00, the UE transmitter 16-10, and the UE processor 16-05 may be implemented in the form of a single chip.

The UE receiver 16-00 and the UE transmitter 16-10 (or transceiver) may transmit or receive a signal to or from the base station. Here, the signal may include control information and data. To this end, the transceiver may include an RF transmitter for up-converting and amplifying a frequency of a transmitted signal, an RF receiver for low-noise amplifying and down-converting a received signal, and the like. However, this is only an embodiment of the transceiver, and the elements of the transceiver are not limited to the RF transmitter and the RF receiver.

In addition, the transceiver may receive a signal through a wireless channel and output the received signal to the UE processor 16-05, and may transmit a signal, which is output from the UE processor 16-05, through a wireless channel.

The memory (not shown) may store programs and data necessary for the operation of the UE. In addition, the memory may store control information or data included in a signal acquired by the UE. The memory may be configured as a storage medium, such as ROM, RAM, hard disk, CD-ROM, and DVD or a combination of storage media.

The UE processor 16-05 may control a series of processes so that the UE may operate according to the above-described embodiment. The UE processor 16-05 may be implemented as a controller or one or more processors.

Figure 17:
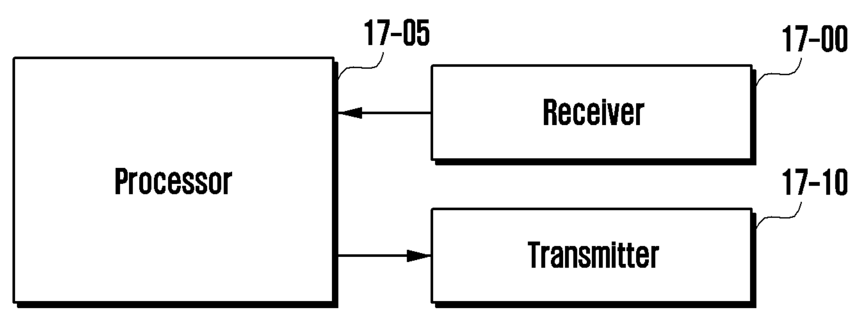
FIG. 17 illustrates the structure of a base station in a wireless communication system according to an embodiment of the disclosure.

FIG. 17 illustrates a structure of a base station in a wireless communication system according to an embodiment of the disclosure.

Referring to FIG. 17, the base station may include a base station receiver 17-00, a base station transmitter 17-10, and a base station processor (a controller) 17-05.

The base station receiver 17-00 and the base station transmitter 17-10 may be collectively called a transceiver. According to the communication method of the base station described above, the base station receiver 17-00, the base station transmitter 17-10, and the base station processor 17-05 of the base station may operate. However, the elements of the base station are not limited to the above-described examples. For example, the base station may include more or fewer elements (e.g., a memory and the like) than the aforementioned elements. In addition, the base station receiver 17-00, the base station transmitter 17-10, and the base station processor 17-05 may be implemented in the form of a single chip.

The base station receiver 17-00 and the base station transmitter 17-10 (or transceiver) may transmit or receive a signal to or from the UE. Here, the signal may include control information and data. To this end, the transceiver may include an RF transmitter for up-converting and amplifying a frequency of a transmitted signal, an RF receiver for low-noise amplifying and down-converting a received signal, and the like. However, this is only an embodiment of the transceiver, and the elements of the transceiver are not limited to the RF transmitter and the RF receiver.

In addition, the transceiver may receive a signal through a wireless channel and output the received signal to the base station processor 17-05, and may transmit a signal, which is output from the base station processor 17-05, through a wireless channel.

The memory (not shown) may store programs and data necessary for the operation of the base station. In addition, the memory may store control information or data included in a signal acquired by the base station. The memory may be configured as a storage medium, such as ROM, RAM, hard disk, CD-ROM, and DVD or a combination of storage media.

The base station processor 17-05 may control a series of processes so that the base station may operate according to the above-described embodiment. The base station processor 17-05 may be implemented as a controller or one or more processors.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Further, although not set forth herein, methods in which separate tables or information containing at least one element included in the tables proposed in the disclosure are used may also be possible.

While the disclosure has been shown and described with reference to various embodiments thereof, it will be understood by those skilled in the art that various changes in form and details may be may be made therein without departing from the spirit and scope of the disclosure as defined by the appended claims and their equivalents.

What is claimed is:

1. A method performed by a terminal in a wireless communication system, the method comprising:

receiving, from a base station, downlink control information (DCI) scheduling a plurality of physical downlink shared channels (PDSCHs) on a physical downlink control channel (PDCCH), wherein the DCI includes information on a time domain resource assignment (TDRA) and information on a transmission configuration indication (TCI) state;

identifying symbol offsets between the PDCCH and the plurality of PDSCHs based on the TDRA;

in case that a first symbol offset between the PDCCH and a first PDSCH included in the plurality of PDSCHs is less than a threshold, receiving, from the base station, the first PDSCH based on a default TCI state; and in case that a second symbol offset between the PDCCH and a second PDSCH included in the plurality of PDSCHs is equal to or greater than the threshold, receiving, from the base station, the second PDSCH based on the TCI state.

2. The method of claim 1, wherein the TDRA indicates a slot offset and a start symbol of the first PDSCH, and wherein the first symbol offset is identified based on the slot offset, the start symbol, and a number of symbols allocated for the PDCCH.

3. The method of claim 1, further comprising:

identifying a time duration for a quasi co-located (QCL), in case that a beam switching time of the terminal is greater than a cyclic prefix (CP) length of the plurality of PDSCHs; and transmitting, to the base station, user equipment (UE) capability information including information on the time duration, wherein the time duration corresponds to the threshold.

4. The method of claim 1, wherein the plurality of PDSCHs are allocated consecutively in a time domain.

5. The method of claim 1, wherein the plurality of PDSCHs includes a first PDSCH set and a second PDSCH set, wherein a time gap is included between the first PDSCH set and the second PDSCH set, wherein the first PDSCH is included in the first PDSCH set, and wherein the second PDSCH is included in the second PDSCH set.

6. The method of claim 5, wherein the time gap is configured by the DCI or a radio resource control (RRC) message.

7. The method of claim 1, receiving, from the base station, a radio resource control (RRC) message including information on a plurality of TCI states; and receiving, from the base station, a medium access control element (MAC CE) indicating at least one TCI state among the plurality of TCI state, wherein the default TCI state corresponds to a TCI state with lowest identifier (ID) among the at least one TCI state.

8. A terminal in a wireless communication system, the terminal comprising:

a transceiver configured to at least one of transmit and receive a signal; and a processor communicably coupled with the transceiver, wherein the processor is configured to:

receive, from a base station, downlink control information (DCI) scheduling a plurality of physical downlink shared channels (PDSCHs) on a physical downlink control channel (PDCCH), wherein the DCI includes information on a time domain resource assignment (TDRA) and information on a transmission configuration indication (TCI) state, identify symbol offsets between the PDCCH and the plurality of PDSCHs based on the TDRA, in case that a first symbol offset between the PDCCH and a first PDSCH included in the plurality of PDSCHs is less than a threshold, receive, from the base station, the first PDSCH based on a default TCI state, and in case that a second symbol offset between the PDCCH and a second PDSCH included in the plurality of PDSCHs is equal to or greater than the threshold, receive, from the base station, the second PDSCH based on the TCI state.

9. The terminal of claim 8, wherein the TDRA indicates a slot offset and a start symbol of the first PDSCH, and wherein the first symbol offset is identified based on the slot offset, the start symbol, and a number of symbols allocated for the PDCCH.

10. The terminal of claim 8, wherein the processor is further configured to:

identify a time duration for a quasi co-located (QCL), in case that a beam switching time of the terminal is greater than a cyclic prefix (CP) length of the plurality of PDSCHs; and transmit, to the base station, user equipment (UE) capability information including information on the time duration, wherein the time duration corresponds to the threshold.

11. The terminal of claim 8, wherein the plurality of PDSCHs are allocated consecutively in a time domain.

12. The terminal of claim 8, wherein the plurality of PDSCHs includes a first PDSCH set and a second PDSCH set, wherein a time gap is included between the first PDSCH set and the second PDSCH set, wherein the first PDSCH is included in the first PDSCH set, and wherein the second PDSCH is included in the second PDSCH set.

13. The terminal of claim 12, wherein the time gap is configured by the DCI or a radio resource control (RRC) message.

14. The terminal of claim 8, wherein the processor is further configured to:

receive, from the base station, a radio resource control (RRC) message including information on a plurality of TCI state; and receive, from the base station, a medium access control element (MAC CE) indicating at least one TCI state among the plurality of TCI state, wherein the default TCI state corresponds to a TCI state with lowest TCI state identifier (ID) among the at least one TCI state.

15. A method performed by a base station in a wireless communication system, the method comprising:

transmitting, to a terminal, downlink control information (DCI) scheduling a plurality of physical downlink shared channels (PDSCHs) on a physical downlink control channel (PDCCH), wherein the DCI includes information on a time domain resource assignment (TDRA) and information on a transmission configuration indication (TCI) state;

in case that a first symbol offset between the PDCCH and a first PDSCH included in the plurality of PDSCHs, transmitting, to the terminal, the first PDSCH based on a default TCI state; and in case that a second symbol offset between the PDCCH and a second PDSCH included in the plurality of PDSCHs, transmitting, to the terminal, the second PDSCH based on the TCI state, wherein the first symbol offset and the second symbol offset is identified based on the TDRA and a number of symbols allocated for the PDCCH.

16. The method of claim 15, wherein the TDRA indicates a slot offset and a start symbol of the first PDSCH, and wherein the first symbol offset is identified based on the slot offset, the start symbol, and a number of symbols allocated for the PDCCH.

17. The method of claim 15, further comprising:

receiving, from the terminal, user equipment (UE) capability information including information on a time duration for a quasi co-located (QCL), wherein the time duration corresponding to a threshold is received, in case that a beam switching time of the terminal is greater than a cyclic prefix (CP) length of the plurality of PDSCHs.

18. The method of claim 15, wherein the plurality of PDSCHs are allocated consecutively in a time domain.

19. The method of claim 15, wherein the plurality of PDSCHs includes a first PDSCH set and a second PDSCH set, wherein a time gap is included between the first PDSCH set and the second PDSCH set, wherein the first PDSCH is included in the first PDSCH set, and wherein the second PDSCH is included in the second PDSCH set.

20. The method of claim 19, wherein the time gap is configured by the DCI or a radio resource control (RRC) message.

* * * * *